US012716477B2

(12) United States Patent
Fox et al.

(10) Patent No.: US 12,716,477 B2
(45) Date of Patent: Aug. 25, 2026

(54) SYSTEMS AND METHODS FOR COUPLING A LOCK PLATE AND ACTUATOR

(71) Applicant: Eaton Intelligent Power Limited, Dublin (IE)

(72) Inventors: Matthew Fox, Ceresco, MI (US); John Allen Grogg, LaOtto, IN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 19/057,679

(22) Filed: Feb. 19, 2025

(65) Prior Publication Data

US 2025/0189027 A1 Jun. 12, 2025

Related U.S. Application Data

(63) Continuation of application No. PCT/EP2023/025385, filed on Aug. 24, 2023.

(Continued)

(30) Foreign Application Priority Data

Aug. 24, 2022 (IN) ............................ 202211048231

(51) Int. Cl.
*F16H 48/24* (2006.01)
*F16H 48/08* (2006.01)
(Continued)

(52) U.S. Cl.
CPC ............ *F16H 48/24* (2013.01); *F16H 48/08* (2013.01); *F16H 2048/204* (2013.01); *F16H 2048/346* (2013.01)

(58) Field of Classification Search
CPC .... F16H 48/24; F16H 48/34; F16H 2048/346; F16D 27/09; F16D 27/118
See application file for complete search history.

(56) References Cited

U.S. PATENT DOCUMENTS 8,316,888 B2 * 11/2012 Beneker ................ F16K 11/048 137/625.26
9,897,187 B2 * 2/2018 Onitake .................. F16H 48/10
(Continued)

FOREIGN PATENT DOCUMENTS

CN 114110122 A 3/2022
WO WO 2014028054 A1 2/2014
(Continued)

OTHER PUBLICATIONS

International Search Report and Written Opinion mailed on Dec. 6, 2023 for International Application No. PCT/ EP2023/25386, 16 pages.

(Continued)

*Primary Examiner* — James J Taylor, II
(74) *Attorney, Agent, or Firm* — Merchant & Gould P.C.

(57) ABSTRACT

A lockable differential assembly includes a lock plate that is rotatable about a rotational axis. The differential assembly also includes actuator assembly having a stator and an armature, the actuator assembly being switchable between energized and de-energized states. A slip ring assembly configured to axially translate based on the locked state or the unlocked state of the differential assembly is provided, including a slip ring that interfaces with the armature at a slip surface, and one or more pins rotationally coupling the slip ring to the lock plate. The slip ring assembly is configured to transmit an axial locking force and an axial return force between the actuator assembly and the lock plate.

18 Claims, 17 Drawing Sheets

Related U.S. Application Data

(60) Provisional application No. 63/400,615, filed on Aug. 24, 2022.

(51) Int. Cl.
*F16H 48/20* (2012.01)
*F16H 48/34* (2012.01)

(56) References Cited

U.S. PATENT DOCUMENTS

| | | | | |
|---|---|---|---|---|
| 10,816,072 | B2 * | 10/2020 | Hillman | B60K 17/165 |
| 11,041,556 | B2 * | 6/2021 | Surve | F16H 48/24 |
| 11,686,380 | B2 * | 6/2023 | Cao | F16H 48/40<br>475/160 |
| 12,129,915 | B2 * | 10/2024 | Surve | F16H 48/34 |
| 12,173,779 | B2 * | 12/2024 | Barillot | F16H 48/30 |
| 12,331,794 | B2 * | 6/2025 | Yaguchi | F16H 48/34 |
| 2021/0131542 | A1 * | 5/2021 | Allen | F16H 48/34 |
| 2021/0310551 | A1 * | 10/2021 | Surve | F16H 48/40 |
| 2025/0189028 | A1 * | 6/2025 | Borgaonkar | F16H 48/24 |

FOREIGN PATENT DOCUMENTS

| | | | |
|---|---|---|---|
| WO | WO 2017100550 | A1 | 6/2017 |
| WO | WO 2018057437 | A1 | 3/2018 |
| WO | WO 2022107267 | A1 | 5/2022 |
| WO | WO 2022167153 | A1 | 8/2022 |
| WO | WO 2024041757 | A1 | 2/2024 |

OTHER PUBLICATIONS

International Search Report and Written Opinion mailed on Nov. 21, 2023 for International Application No. PCT/EP2023/25385, 14 pages.

* cited by examiner

SYSTEMS AND METHODS FOR COUPLING A LOCK PLATE AND ACTUATOR

PRIORITY

This application is a continuation under 35 U.S.C. § 365(c) of International Patent Application No. PCT/EP2023/025385, filed on 24 Aug. 2023, which claims the benefit under 35 U.S.C. § 119(e) of U.S. Provisional Patent Application No. 63/400,615, filed 24 Aug. 2022, and under 35 U.S.C. § 119(a) of Indian Provisional Patent Application No. 202211048231, filed 24 Aug. 2022, the entirety of all of which are incorporated herein by reference.

TECHNICAL FIELD

The present disclosure relates generally to vehicle powertrains, and more specifically to systems, devices, and methods for lockable differential assemblies.

BACKGROUND

Vehicle differential assemblies are torque control devices that enable axle shafts to be operated at dissimilar rotational speeds, such as when a vehicle negotiates a turn. Lockable differential assemblies permit axle shafts to be constrained, or locked, to operate at the same rotational speed, for instance, in low-traction road conditions. Electronically lockable differential assemblies permit a user to selectively enable or disable the locking function through electronically actuated means, for example by using a switch, button, or other user interface element located in the vehicle.

Increasingly challenging packaging constraints, safety requirements, and reliability targets motivate design improvements of electronically locking differential assemblies. Considerations specific to electric vehicles further motivate innovations in their design, packaging, and integration with the vehicle.

The description provided herein is for the purpose of generally presenting the context of the disclosure. Work of the presently named inventors, to the extent it is described in this section, as well as aspects of the description that cannot otherwise qualify as prior art at the time of filing, are neither expressly nor impliedly admitted as prior art against the present disclosure.

SUMMARY OF PARTICULAR EMBODIMENTS

In particular embodiments, a lockable differential assembly is disclosed, the differential assembly including a lock plate rotatable about a rotational axis, wherein the differential assembly is configured to be in a locked state or an unlocked state based on a selective axial engagement of the lock plate relative to a lock gear; an actuator assembly including a stator and an armature, the actuator assembly configured to be switchable between an energized state and a de-energized state; and a slip ring assembly configured to axially translate corresponding to the locked state or the unlocked state of the differential assembly, the slip ring assembly including: a slip ring interfacing with the armature at a slip surface configured to permit relative rotation between the slip ring and the armature; and one or more pins rotationally coupling the slip ring to the lock plate, wherein the slip ring assembly is configured to transmit an axial locking force from the actuator assembly to the lock plate when the actuator assembly is energized, and wherein the slip ring assembly is configured to transmit an axial return force from the lock plate to the actuator assembly when the actuator assembly is de-energized.

In particular embodiments, which may combine the features of some or all of the above embodiments, the differential assembly further includes a lock detection sensor assembly including a sensor and a target, the lock detection sensor assembly configured for detection of an axial distance between the stator and the armature. In particular embodiments, which may combine the features of some or all of the above embodiments, one of the sensor and the target is coupled to the armature, and the other of the sensor and the target is coupled to the stator.

In particular embodiments, which may combine the features of some or all of the above embodiments, the differential assembly further includes an anti-rotation assembly including a first connecting member coupling the sensor of the lock detection sensor assembly to a stator housing of the actuator assembly; and a second connecting member coupling the target of the lock detection sensor assembly to the armature, wherein the first connecting member or the second connecting member includes one or more extended structures configured to constrain the armature in a fixed rotational position relative to the stator.

In particular embodiments, which may combine the features of some or all of the above embodiments, the detection of the axial distance between the stator and the armature by the lock detection sensor assembly is based on detecting a magnetic field strength, wherein the slip ring is symmetric about a longitudinal plane passing through the rotational axis and the lock detection sensor assembly to facilitate an increased accuracy of lock detection.

In particular embodiments, which may combine the features of some or all of the above embodiments, the detection of the axial distance between the stator and the armature by the lock detection sensor assembly is based on detecting a magnetic field strength, wherein the one or more pins are symmetrically distributed about the rotational axis to facilitate an increased accuracy of lock detection. In particular embodiments, which may combine the features of some or all of the above embodiments, the stator includes a stator coil, wherein energizing the actuator assembly includes passing electrical current through the stator coil to generate a magnetic field, and wherein the armature experiences a magnetic force toward the stator coil based on the magnetic field generated when the actuator assembly is energized.

In particular embodiments, which may combine the features of some or all of the above embodiments, the slip ring is configured to focus the magnetic field generated in the energized state of the actuator assembly through an air gap between the armature and the stator to facilitate an increased efficiency of the actuator assembly actuating the locked state of the differential assembly. In particular embodiments, which may combine the features of some or all of the above embodiments, the slip ring includes at least one axial groove to permit flow of a hydraulic fluid and facilitate a reduced hydraulic damping of the axial translation of the slip ring assembly.

In particular embodiments, which may combine the features of some or all of the above embodiments, for each of the one or more pins, the slip ring includes: a bore having a bore diameter and configured to receive the respective pin; and a slot configured to facilitate access to the respective pin, wherein a slot width of the slot has a value between the bore diameter and ten times the bore diameter.

In particular embodiments, which may combine the features of some or all of the above embodiments, the slip ring is configured to radially align the armature relative to the rotational axis. In particular embodiments, which may combine the features of some or all of the above embodiments, the slip ring is configured to radially align the stator relative to the rotational axis.

In particular embodiments, which may combine the features of some or all of the above embodiments, the slip ring assembly further includes one or more features to axially constrain the armature relative to the slip ring. In particular embodiments, which may combine the features of some or all of the above embodiments, the slip ring assembly further includes one or more features to axially constrain the slip ring relative to the one or more pins.

In particular embodiments, which may combine the features of some or all of the above embodiments, the one or more features include a groove or a raised edge provided in the slip ring or the one or more pins. In particular embodiments, which may combine the features of some or all of the above embodiments, the one or more features include a washer, a snap ring, or an e-clip. In particular embodiments, which may combine the features of some or all of the above embodiments, one or more of the pins are press-fit into the lock plate.

In particular embodiments, the differential assembly includes a differential casing; a lock gear rotatably provided within the differential casing; a lock plate rotatable about a rotational axis, wherein the differential assembly is configured to be in a locked state or an unlocked state based on a selective axial engagement of the lock plate relative to the lock gear; a biasing member configured to axially bias the lock gear away from the lock plate; an actuator assembly including a stator and an armature, the actuator assembly configured to be switchable between an energized state and a de-energized state; a lock detection sensor assembly including a sensor and a target, the lock detection sensor assembly configured for detection of an axial distance between the stator and the armature; and a slip ring assembly configured to axially translate corresponding to the locked state or the unlocked state of the differential assembly, the slip ring assembly including: a slip ring interfacing with the armature at a slip surface configured to permit relative rotation between the slip ring and the armature; and one or more pins rotationally coupling the slip ring to the lock plate, wherein the slip ring assembly is configured to transmit an axial locking force from the actuator assembly to the lock plate when the actuator assembly is energized, and wherein the slip ring assembly is configured to transmit an axial return force from the lock plate to the actuator assembly when the actuator assembly is de-energized.

In particular embodiments, which may combine the features of some or all of the above embodiments, the slip ring includes at least one axial groove to permit flow of a hydraulic fluid and facilitate a reduced hydraulic damping of the axial translation of the slip ring assembly.

In particular embodiments, the devices, systems, and techniques described herein relate to a method of assembling a lockable differential assembly, the method including: providing a lock gear and a lock plate within a differential casing, the lock gear and the lock plate selectively engageable by relative axial translation, the lock gear and the lock plate axially biased apart by a biasing member and rotatable about a rotational axis; rotationally coupling the lock plate with a slip ring via one or more pins, a slip ring assembly including the slip ring and the one or more pins; providing an actuator assembly including a stator and an armature, the slip ring axially coupled with the armature, a slip interface between the slip ring and the armature configured to permit relative rotation therebetween, wherein the armature is configured to axially translate toward the stator based on energizing the actuator assembly; and providing a lock detection sensor assembly including at least one sensor component respectively coupled to each of the armature and the stator, the lock detection sensor assembly configured for detection of an axial distance between the stator and the armature, wherein the slip ring assembly is configured to transmit an axial locking force from the actuator assembly to the lock plate when the actuator assembly is energized, and wherein the slip ring assembly is configured to transmit an axial return force from the lock plate to the actuator assembly when the actuator assembly is de-energized.

BRIEF DESCRIPTION OF THE DRAWINGS

The present disclosure will be described in greater detail below based on the exemplary figures. The disclosure is not limited to the exemplary embodiments. Other features and advantages of various embodiments of the present disclosure will become apparent by reading the following detailed description with reference to the attached drawings which illustrate the following.

Figure 1:
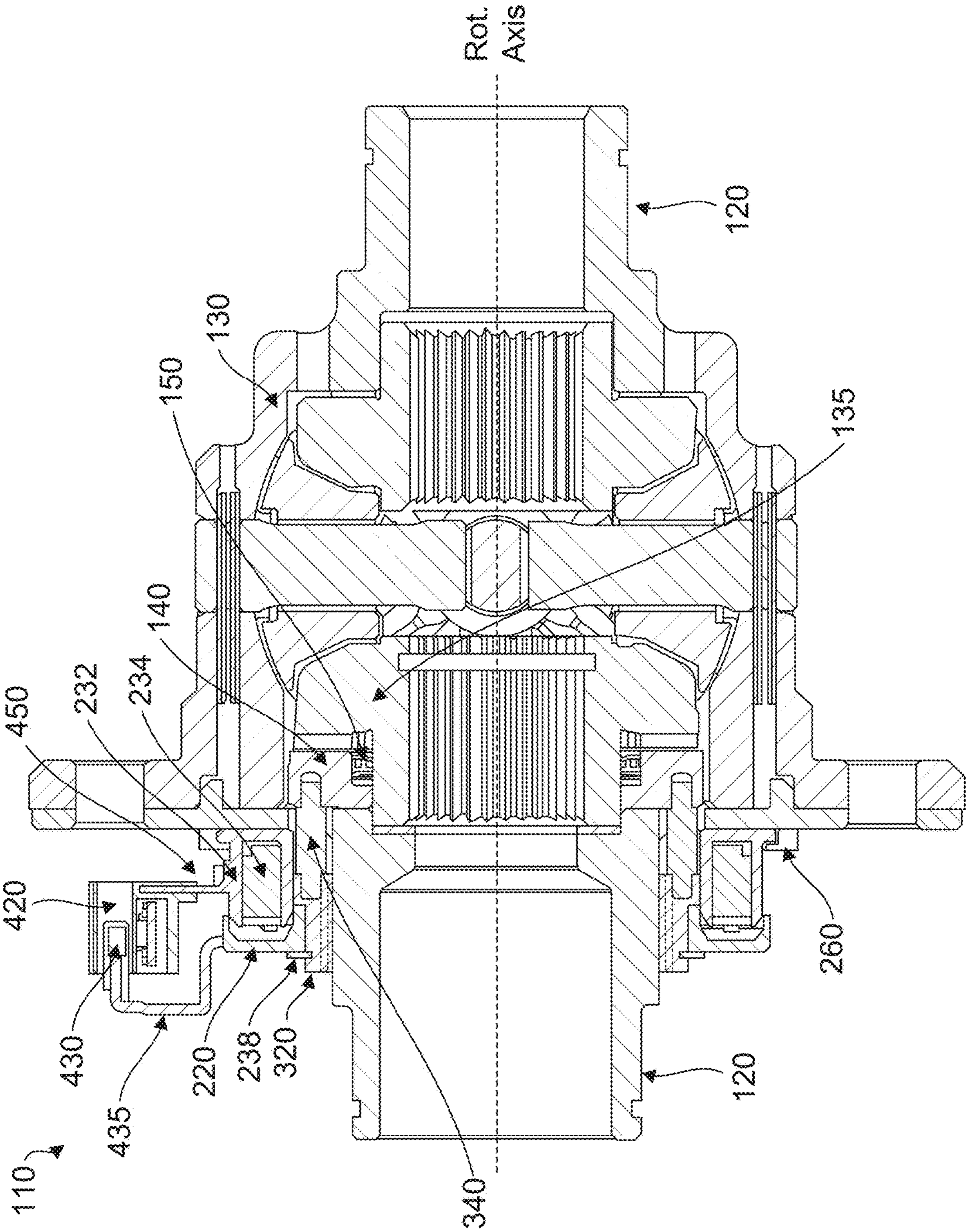
FIG. 1 illustrates a schematic sectional side view of an electronically locking differential assembly, according to particular embodiments.

It should be noted that figures provided may be illustrated schematically rather than literally or precisely; components and aspects of the figures may not necessarily be to scale. Moreover, while like reference numerals may designate corresponding parts throughout the different views in many cases, like parts may not always be provided with like reference numerals in each view.

DESCRIPTION OF EXAMPLE EMBODIMENTS

In accordance with various embodiments of the present disclosure, various mechanisms, assemblies, arrangements, and methods of operation, manufacture, and/or assembly of vehicle powertrains, lockable differential assemblies, and/or related subsystems are disclosed herein. For clarity, while particular aspects will be described and/or illustrated to provide a better understanding, not all features of each embodiment may be described in this specification.

With reference to the figures, FIG. 1 illustrates a schematic sectional side view of an electronically locking differential assembly, according to particular embodiments. In particular embodiments, a lockable differential assembly 110 may comprise a lock plate 140 rotatable about a rotational axis within a differential case 130. In particular embodiments, differential assembly 110 may be configured to be in a locked state or an unlocked state based on a relative axial location of a lock plate 140, and/or a selective axial engagement of lock plate 140 relative to a lock gear 135.

By way of example and not limitation, in the absence of an applied locking force, lock plate 140 may be biased, such as mechanically biased by return springs, to maintain differential assembly 110 in an unlocked state, wherein the lock plate 140 may be disengaged from a lock gear 135, and the axle shafts 120 can be free to rotate at different rotational speeds. In particular embodiments, a return spring force, such as due to return spring 150, may act on the lock plate 140 (toward the left, in the frame of reference of FIG. 1), thereby maintaining an unlocked differential state. In particular embodiments, if a sufficient locking force is applied to the lock plate 140 to translate it axially to the right (again, in the frame of reference of FIG. 1) against the return spring force, a locked state of the differential assembly 110 may be engaged, wherein the axle shafts 120 can be constrained to rotate at identical rotational speeds.

Continuing with reference to FIG. 1, in particular embodiments, an actuator assembly, such as electronic actuator assembly 210, which may comprise an armature 220 and a stator 230 having a stator coil 234, can be used to effect electronic locking of differential assembly 110. In particular embodiments, electronic actuator assembly 210 may be configured to be switchable between an energized state and a de-energized state.

Figure 2:
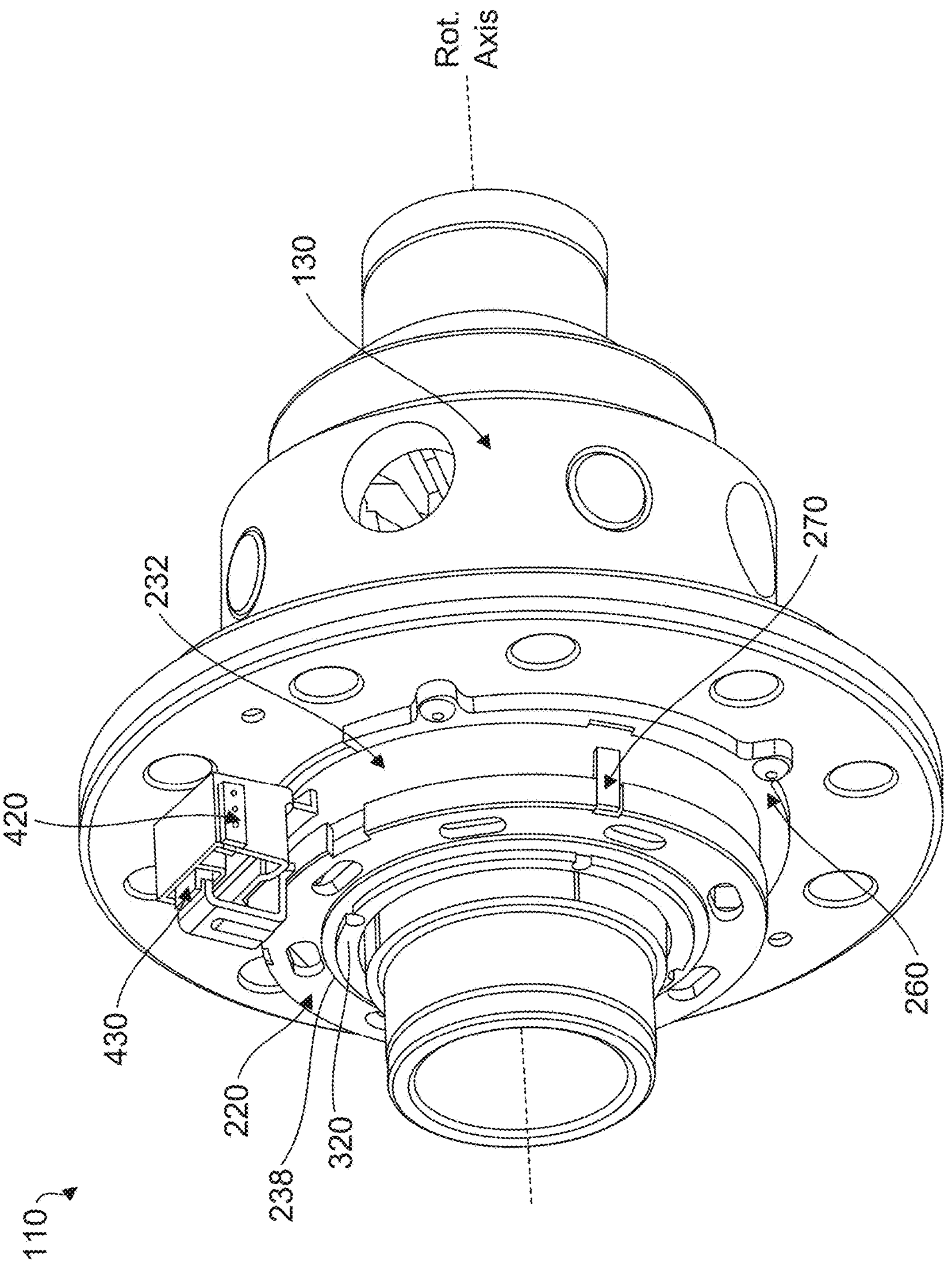
FIG. 2 illustrates a schematic front perspective view of an electronically locking differential assembly, according to particular embodiments.

FIG. 2 illustrates a schematic front perspective view of an electronically locking differential assembly, according to particular embodiments. As depicted in FIG. 2, in particular embodiments, the armature 220 and the stator coil 234 (located within the stator housing 232) may be substantially annular components that can be located to be concentric with the rotational axis of the differential assembly 110. In particular embodiments, as will be further discussed herein, armature 220 and/or stator coil 234 may require constraining and/or piloting along one or more axes to occupy or remain in particular configurations and/or positions. In particular embodiments, the stator housing 232 may include one or more electrical leads 240 to supply current for electrically energizing the stator coil 234, and/or conduits for guiding electrical leads 240. In particular embodiments, electrical leads 240 may connect to a vehicle electrical system, such as through an electrical harness.

In particular embodiments, electronic actuator assembly 210 can be energized and/or de-energized. By way of example and not limitation, energizing electronic actuator assembly 210 may comprise passing electrical current through the stator coil 234 to generate a magnetic field, and armature 220 may experience a magnetic force toward the stator coil 234 based on the magnetic field generated when electronic actuator assembly 210 is energized.

By way of example and not limitation, when the stator coil 234 is electrically energized, armature 220 can experience an electromagnetic attractive force toward the stator coil 234 sufficient to axially translate armature 220 (toward the right, in the frame of reference of FIG. 1). Corresponding to this axial translation, armature 220 can exert a rightward axial force, such as through a slip ring 320 and/or one or more transfer pins 340, which slip ring and/or pins in turn can exert a force on the lock plate 140 (toward the right, in the frame of reference of FIG. 1). In particular embodiments, such an axial force directly or indirectly applied by electronic actuator assembly 210 on lock plate 140 engaging the locked state of the differential assembly 110 may act against a return force, such as may be provided by a biasing member like return spring 150.

In particular embodiments, without limitation, transfer pins 340 may be referred to as push pins, indexing pins, or simply, as pins.

Figure 9:
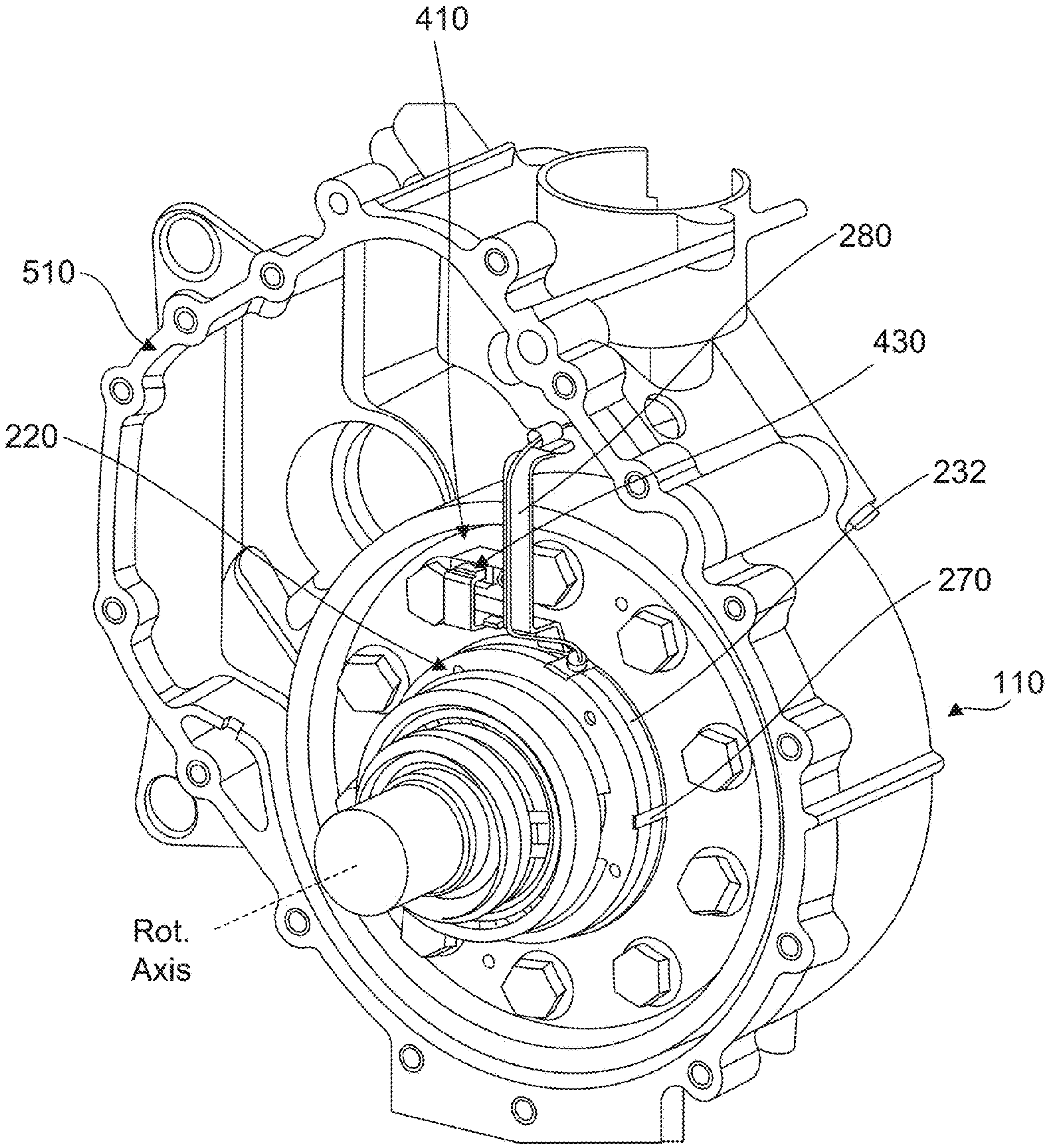
FIG. 9 illustrates a schematic front perspective view of an electronically locking differential assembly assembled within an axle housing, with the axle housing depicted sectioned, according to particular embodiments.

During a normal running state of differential assembly 110, several components of differential assembly 110 can rotate about a rotational axis of differential assembly 110. In particular embodiments, by way of non-limiting example, particular components that may be rotationally stationary relative to the rotating components can include one or more of the electronic actuator assembly 210 (comprising stator 230 including the stator coil 234 in stator housing 232, and/or armature 220). By way of example and not limitation, other components that may be separately or additionally rotationally stationary in some embodiments can include lock detection sensor assembly 410 (further comprising a lock detection sensor 420, and sensor target 430). In particular embodiments, one or more of these components may be constrained to be rotationally stationary relative to the rotating components of the differential assembly 110 based on mechanical coupling to rotationally stationary vehicle structures, and/or to each other. By way of example and not limitation, an axle housing 510 (e.g., as depicted in FIG. 9) may provide a rotationally stationary anchoring structure or frame of reference to constrain particular parts of differential assembly 110 to be held rotationally stationary relative to the rotating components.

Figure 3:
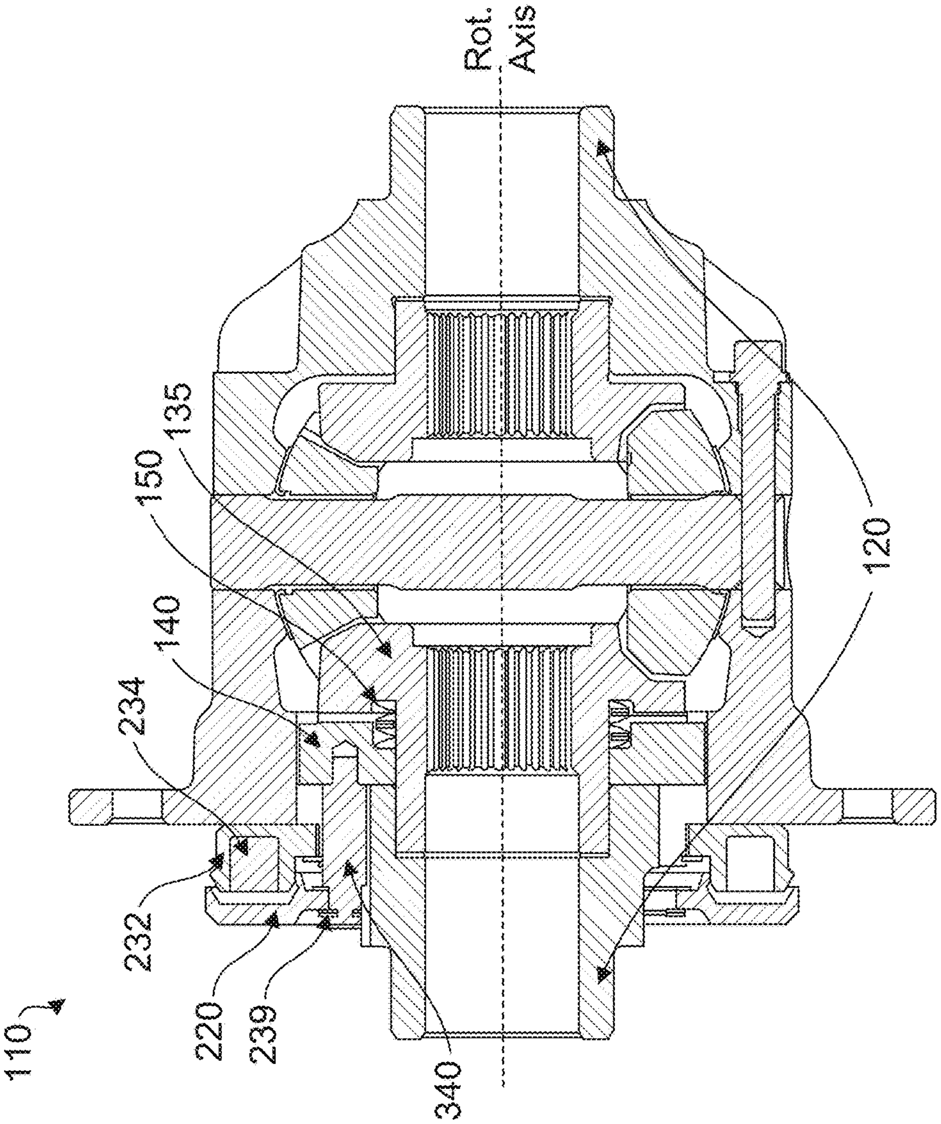
FIG. 3 illustrates a schematic sectional side view of an electronically locking differential assembly, according to particular embodiments.
Figure 4:
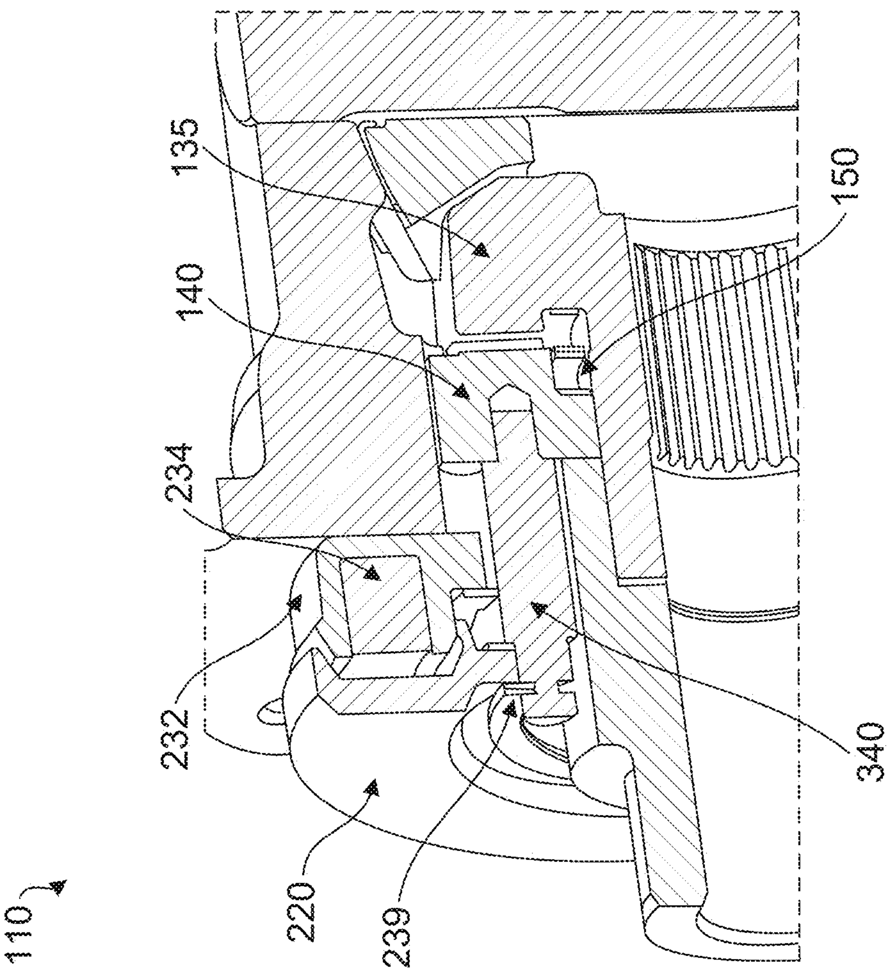
FIG. 4 illustrates a schematic enlarged front perspective view of an electronically locking differential assembly, according to particular embodiments.

In particular embodiments (for example and not by way of limitation, as illustrated in FIGS. 3 and 4), the armature 220 may directly interface (i.e., without an intermediate slip ring, which will be further discussed herein) with one or more transfer pins 340, wherein the interface can be configured to transmit axial forces and/or axial translations between each transfer pin 340 and the armature 220. In particular embodiments, armature 220 may be additionally or separately axially constrained, such as using a washer 239. The embodiment shown in FIGS. 3 and 4 may comprise three transfer pins 340. Alternative designs are possible, such as having a different number of transfer pins 340.

Particular embodiments of differential assembly 110 may comprise a relatively limited reaction surface available between armature 220 and transfer pins 340. In particular embodiments, transfer pins 340 may be asymmetrically distributed, and/or may comprise materials that can interfere with sensitive magnetic sensing equipment associated with the differential assembly 110, such as a lock detection sensor assembly. In particular embodiments, unintended variation of a magnetic field, such as changes based on relative rotation of a component, can prevent accurate and/or precise use of magnetic sensing equipment. Additional details and aspects relating to the lock detection sensor will be further discussed herein.

In particular embodiments, a slip ring assembly 310 may configured to axially translate corresponding to the locked state or the unlocked state of differential assembly 110. In particular embodiments, the slip ring assembly 310 may comprise a slip ring 320.

In particular embodiments, slip ring assembly 310 may be configured to transmit an axial locking force from electronic actuator assembly 210 to lock plate 140 when electronic actuator assembly 210 is energized. By way of example and not limitation, an axial locking force may be generated based on armature 220 experiencing a magnetic force toward stator coil 234 when electronic actuator assembly 210 is energized.

In particular embodiments, slip ring assembly 310 may be configured to transmit an axial return force from lock plate 140 to electronic actuator assembly 210 when electronic actuator assembly 210 is de-energized. By way of example and not limitation, an axial return force may be based on a return or restoring force acting to separate lock plate 140 from lock gear 135, and/or acting to axially translate lock plate 140 away from lock gear 135 and toward electronic actuator assembly 210 (i.e., toward the left, in the frame of reference of FIG. 1).

In particular embodiments, slip ring 320 may interface with armature 220 at a slip surface configured to permit relative rotation between slip ring 320 and armature 220. By way of example and not limitation, slip ring 320 can be made of dissimilar materials from adjacent surfaces, such as brass, and/or other metals or non-metallic materials.

In particular embodiments, slip ring 320 may be configured to focus the magnetic field and/or intensify the magnetic flux generated in the energized state of electronic actuator assembly 210, for example, through an air gap between armature 220 and stator 230. In particular embodiments, slip ring 320 may be separately or additionally configured to minimize magnetic losses to a hub. By way of example and not limitation, in particular embodiments, slip ring 320 may focus, shape, guide, and/or confine magnetic field lines between an armature/stator gap located radially outward of slip ring 320. By way of example and not limitation, in particular embodiments, slip ring 320 may focus, shape, guide, and/or confine magnetic field lines so as to minimize magnetic losses to a hub, which may be located radially inward of slip ring 320, and/or a differential case 130. In particular embodiments, slip ring 320 may be separately or additionally configured to axially optimize the magnetic field, such as to maximize a magnetic pull-in force acting on armature 220 when electronic actuator assembly 210 is energized.

By way of example and not limitation, configuring slip ring 320 to focus the magnetic field and/or minimize magnetic losses to the hub and/or other components of differential assembly 110 can facilitate an increased efficiency of energy requirement for electronic actuator assembly 210 actuating a locked state of differential assembly 110. Accordingly, in particular embodiments, a smaller, lighter, and/or lower power electronic actuator assembly 210 may be used for actuating a locked state.

Figure 8A:
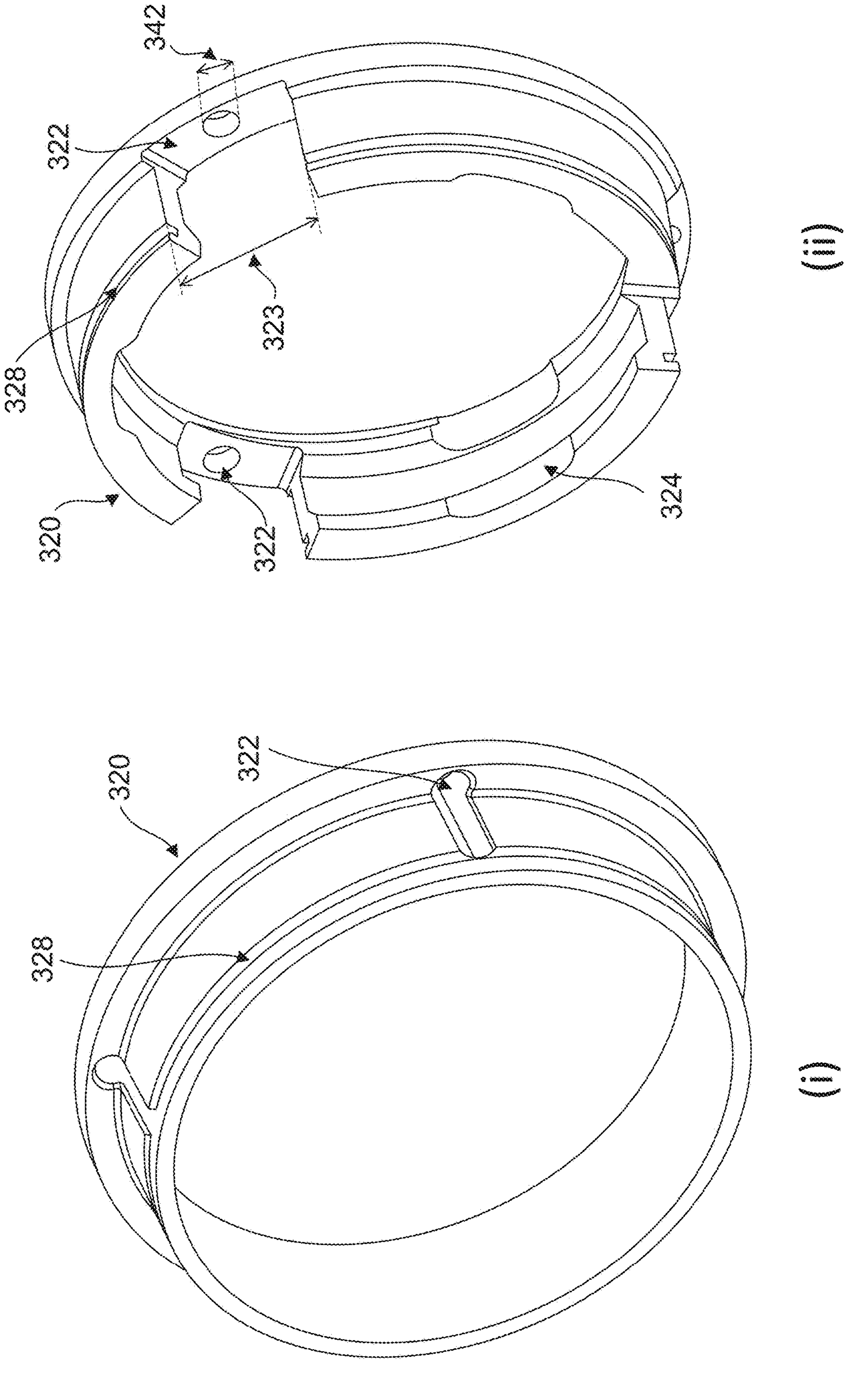
FIG. 8A illustrates schematic front perspective views of slip rings, according to particular embodiments.

In particular embodiments, a geometry, material and/or manufacturing methods for slip ring 320 may take into account one or more of: (a) load bearing requirements for axial and/or radial alignment and/or constraining of particular interfacing components; (b) frictional requirements for relative slip of particular interfacing requirements; (c) fatigue, hardness, and/or other structural requirements for operating life, such as without requiring replacement; (d) magnetic performance, such as to shape, confine, guide, and/or reduce magnetic losses. By way of example and not limitation, FIG. 8A depicts and discloses geometric features of particulars embodiments to meet these requirements.

In particular embodiments, slip ring 320 may be manufactured by using suitable methods to include one or more of the desired performance characteristics disclosed herein. By way of example and not limitation, slip ring 320 may be manufactured from a powdered or sintered blank, optionally followed by finish machining. In particular embodiments, slip ring 320 may be manufactured using one or more non-magnetic materials. In particular embodiments, one or more materials for making slip ring 320 may be selected based on their magnetic properties, for reducing magnetic losses. In particular embodiments, one or more materials for making slip ring 320 may be selected based on at least their magnetic permeability properties, for shaping, guiding, focusing, and/or otherwise interacting with magnetic fields in the proximity of magnetic influence of slip ring 320.

In particular embodiments, one or more transfer pins 340 may be used to rotationally couple slip ring 320 to lock plate 140. In particular embodiments, one or more of transfer pins 340 may be press-fit into lock plate 140.

Figure 5:
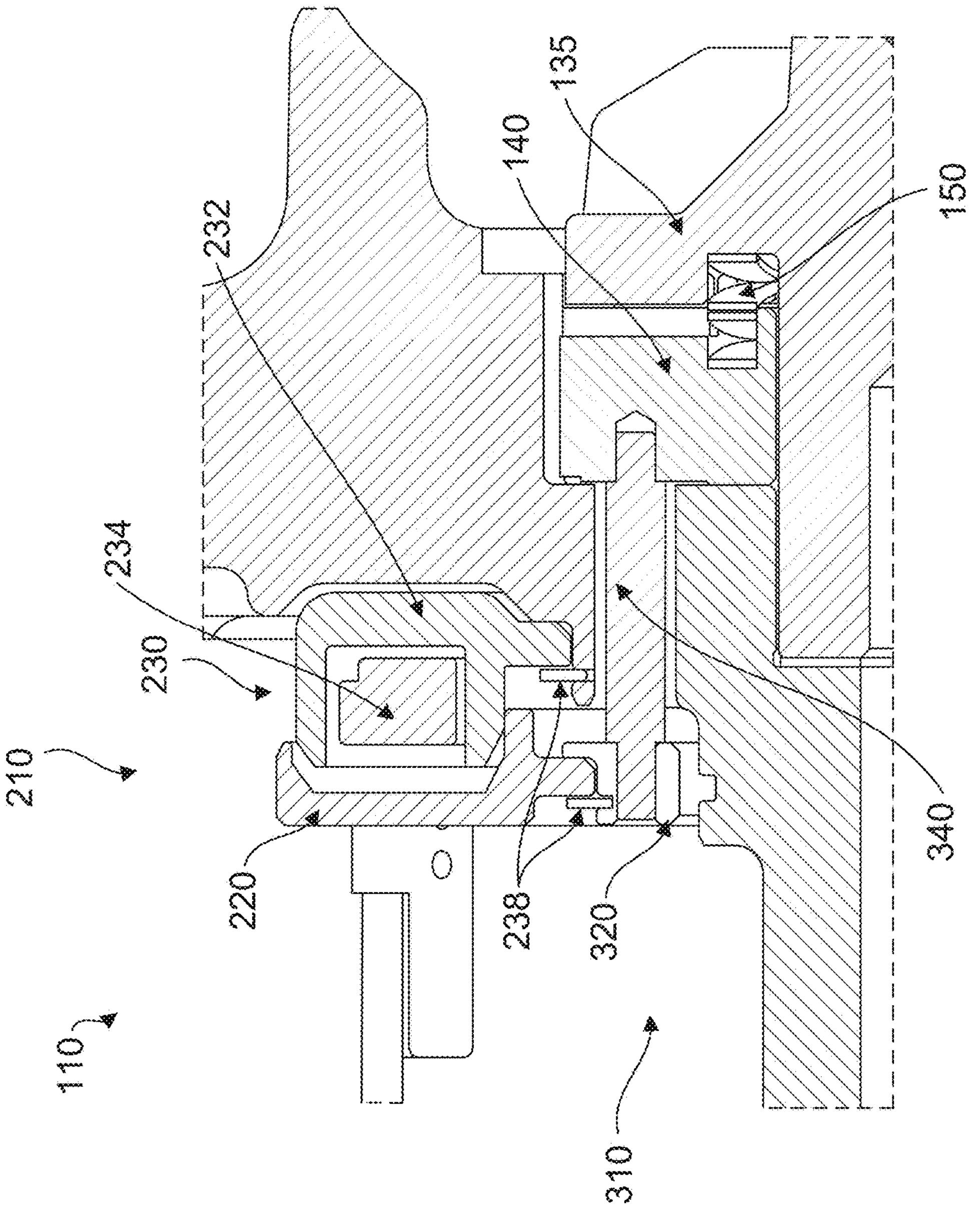
FIG. 5 illustrates a schematic enlarged sectional side view of an electronically locking differential assembly, according to particular embodiments.

In particular embodiments, such as depicted in FIG. 5, a slip ring 320 may be used between the armature 220 and one or more transfer pins 340, wherein the interface of armature 220 and slip ring 320 can be configured to enable one or more of: (i) relative rotational motion (slip) between armature 220 and slip ring 320, to permit armature 220 to remain rotationally stationary relative to rotating components of differential assembly 110; (ii) transmission of axial forces and/or axial translations between armature 220 and slip ring 320 in one or more directions of axial motion; (iii) more rigid constraint of armature 220 to move in axial correspondence with lock plate 140 and/or transfer pins 340.

In contrast to an exemplary embodiment lacking a slip ring 320, such as illustrated in FIGS. 3 and 4, a design of a slip ring 320 may be provided in particular embodiments, such as depicted in FIGS. 5 and 8A by way of non-limiting example. In particular embodiments, slip ring 320 may be configured to be generally annular. In particular embodiments, therefore, slip ring 320 may provide optimal surface area(s) of contact for supporting armature 220, and/or for coupling selective axial force and/or axial translation in one or both directions between armature 220 and lock plate 140. By way of example and not limitation, such as for the embodiment illustrated in FIG. 5, a full 360° of contact can be available between slip ring 320 and armature 220. A full 360° of contact may separately or additionally be available between slip ring 320 and each of one or more transfer pins 340.

In particular embodiments, slip ring 320 may be made from specific materials, e.g., non-metallic materials, with at least the advantage of non-interference with sensitive magnetic sensing equipment associated with differential assembly 110, such as a lock detection sensor assembly 410, which will be further discussed herein.

In particular embodiments, slip ring 320 may provide radial support, constraint, and/or piloting of particular components interfacing with slip ring 320. In particular embodiments, piloting of a component can involve mechanically constraining that component to a concentric location about a rotational axis of differential assembly 110. By way of example and not limitation, relative to the rotating components of the differential assembly, rotationally stationary components such as the armature and the stator housing require piloting to remain concentrically located about the same axis as the rotating components. Piloting these components may require providing resistance to forces and moments that may act to relatively tilt and/or offset axes of these components relative to a rotational axis of interest, such as that of differential assembly 110.

In particular embodiments, slip ring 320 may be configured to radially align and/or pilot armature 220 relative to a rotational axis of differential assembly 110. By way of example and not limitation, such as illustrated in FIGS. 1 and 5, armature 220 may be partially or entirely radially supported on or by slip ring 320. In particular embodiments, slip ring 320 may be configured to radially align and/or pilot stator 230, such as stator housing 232, relative to a rotational axis of differential assembly 110. By way of example and not limitation, such as illustrated in FIG. 1, stator housing 232 may be partially or entirely radially supported on or by slip ring 320.

Based on mechanics, it can be appreciated that interfacing surfaces with large areas and/or those located at large radii from the rotational axis can be desirable for effective piloting of concentrically located components. However, recent applications (such as for electric vehicles) have led to tighter packaging requirements and higher torque density specifications, which can pose significant design challenges.

In particular embodiments, particular features may be used in conjunction with slip ring 320 to axially constrain relative motion of particular components interfacing with slip ring 320, and/or to more rigidly constrain particular components to move in tightly coupled axial correspondence with lock plate 140 and/or transfer pins 340.

In particular embodiments, the slip ring assembly 310 may further comprise one or more features to axially constrain an interfacing component relative to slip ring 320, wherein an interfacing component may comprise, as non-limiting examples, armature 220, stator 230, and/or transfer pins 340. By way of example and not limitation, such as illustrated in FIG. 5 relative to armature 220, a groove and/or a raised edge may be provided in slip ring 320 to axially constrain an interfacing component. Separately or additionally, an external structure, feature, and/or component may be used to axially constrain an interfacing component relative to slip ring 320. By way of example and not limitation, one or more of a washer, a snap ring, a circlip, a C-clip, and/or an e-clip may be used to provide axial constraint. By way of example and not limitation, FIGS. 5 and 12C depict the use of a snap ring 238 to axially constrain armature 220 along one direction. By way of example and not limitation, FIGS. 8C and 12D depict the use of e-clip 326 to axially constrain a transfer pin 340 relative to slip ring 320. By way of example and not limitation, FIG. 8A illustrates a groove 328 provided on slip ring 320, which may be used to receive and/or capture a snap ring 238 in particular embodiments.

In particular embodiments, a retaining ring 260 may be used to axially constrain stator housing 232 in place. By way of example and not limitation, retaining ring 260 may axially constrain stator housing 232 relative to differential case 130. In particular embodiments, such as illustrated by way of non-limiting example in FIG. 8C, retaining ring 260 may be a multi-part retaining ring. In particular embodiments, retaining ring 260 may comprise a discontinuous retaining ring.

In particular embodiments, differential case 130 may be referred to as a differential housing.

In particular embodiments, slip ring 320 may comprise at least one axial groove or channel to permit flow of a hydraulic fluid, such as oil. By way of example and not limitation, such a passage can provide for improved lubrication. In particular embodiments, such as depicted by oil flow channel 324 in FIGS. 8C, 12B, and 12C, an axial groove or channel can facilitate a reduced hydraulic damping of axial translation of slip ring assembly 310. An axial groove or channel for the purpose of lubrication may be combined in particular embodiments with a corresponding feature to facilitate a reduced hydraulic damping. In particular embodiments, one or the other function, or both functions, may be served by different structures. In particular embodiments, only particular ones of the functions of lubrication and/or reduced hydraulic damping may be required or provided for. By way of example and not limitation, reducing a hydraulic damping by providing better flow of hydraulic fluid can permit more rapid state change and/or actuation of locking and unlocking of differential assembly 110, such as based on energizing and/or de-energizing of electronic actuator assembly 210.

In particular embodiments, for each of one or more transfer pins 340, slip ring 320 may comprise a bore 342 having a bore diameter configured to receive the respective transfer pin 340. In particular embodiments, such as illustrated in FIGS. 8A, 8C and 12B, slip ring 320 may comprise one or more slots 322. In particular embodiments, one or more slots 322 may provide and/or improve access to transfer pins 340. In particular embodiments, slot 322 may have a slot width 323 ranging between one and ten times a bore diameter of bore 342.

In some embodiments, it may be desirable, and/or required by regulation, to verify the state of lock or unlock of differential assembly 110 by physical sensing. By way of example and not limitation, it may be unsafe and/or inefficient to operate the vehicle with an actual differential lock status contrary to the user's expectation or information.

In particular embodiments, sensing of differential lock status may be accomplished using a lock detection sensor assembly 410. In particular embodiments, such as illustrated by way of non-limiting examples in FIGS. 1, 2, 10, and 12B, lock detection sensor assembly 410 may comprise a lock detection sensor 420, and/or a sensor target 430. In particular embodiments, lock detection sensor assembly 410 can be configured for detection of an axial distance between armature 220 and stator 230.

In particular embodiments, a lock detection sensor 420, such as a Hall effect sensor, may be configured to operate based on detecting a magnetic field strength and/or related quantities, such as a magnetic field strength, and/or a magnetic flux. By way of example and not limitation, lock detection sensor 420 may be configured to detect a magnitude and/or a direction of such or other particular physical quantities. In particular embodiments, lock detection sensor 420 may be calibrated to correlate a varying relative distance of a target, such as an axial distance of a sensor target 430, relative to a measured varying magnetic field strength, and/or other physical quantities. In particular embodiments, lock detection sensor 420 may be sensitive to the influence and perturbations of a surrounding magnetic field by other adjacent components, whether desirable or unintentional. By way of example and not limitation, unintentional variation of a measured magnetic field strength based on a distribution of rotating components around lock detection sensor 420 may decrease an accuracy and/or precision of lock detection sensor assembly 410 detecting an axial distance between armature 220 and stator 230.

In particular embodiments, to permit detection of an axial distance between armature 220 and stator 230 by lock detection sensor assembly 410, one of lock detection sensor 420 and sensor target 430 may be coupled to armature 220, and the other of lock detection sensor 420 and sensor target 430 may be coupled to stator 230.

By way of example and not limitation, according to particular embodiments, lock detection sensor 420 may be rigidly attached to the frame of reference of the stator housing, such as via a sensor post 450. By way of example and not limitation, according to particular embodiments, a sensor target 430, such as a magnetic target, may be rigidly attached to axially translate with an axially movable armature 220, such as via a sensor target bracket 435.

In particular embodiments, the axial location of the armature 220 may serve as a proxy for the locked or unlocked state and/or relative axial position of lock plate 140 relative to lock gear 135, such as based on armature 220 and lock plate 140 ideally being perfectly axially coupled in both directions. Such detection of the relative axial distance (effectively) between armature 220 and stator 230 to determine a locked or unlocked state and/or axial position of lock plate 140 relative to lock gear 135 can also be accomplished by other suitable devices that detect proximity and/or physical contact.

By way of example and not limitation, in ideal operation, as described previously, when the stator 230 is de-energized, there may be no rightward force on armature 220 (in the frame of reference of FIG. 1). Accordingly, in particular embodiments and following the frame of reference of FIG. 1, based on return spring 150 pushing on lock plate 140 toward the left, lock plate 140 may axially translate in that leftward direction, which in turn can apply a force on, and correspondingly provide an axial translation of, armature 220 to the left via transfer pins 340. According to this non-limiting example, a correspondingly increased distance between the sensor target 430 (attached to armature 220) and lock detection sensor 420 (attached to stator 230) can be interpreted as an unlocked state of differential assembly 110.

Conversely, following the same particular embodiment in the same frame of reference of FIG. 1, when stator 230 is energized, an attractive magnetic force on armature 220 can pull armature 220 toward the right, which may translate through one or more of slip ring 320 and transfer pins 340 to the lock plate 140, thereby engaging a locked state of differential assembly 110. According to this non-limiting example, the corresponding reduced distance between the sensor target 430 (attached to armature 220) and lock detection sensor 420 (attached to stator 230) can be then interpreted as a locked state of differential assembly 110.

As previously discussed herein, independent verification of a locked or unlocked status, such as provided by the lock detection sensor assembly 410, can be important for safe and/or efficient operation of a vehicle. However, it may be possible according to particular designs and/or vehicle operating conditions for the respective axial positions of armature 220 and lock plate 140 to not perfectly mutually correspond, which can make lock detection sensing potentially inaccurate in its determination or interpretation of the locked or unlocked status of differential assembly 110.

By way of example and not limitation, in particular embodiments and/or operating conditions, it is possible for lock plate 140 to unexpectedly and/or undesirably remain in a locked position despite de-energizing stator 230 and thereby freeing armature 220 to translate away from the stator (toward the left, in the frame of reference of FIG. 1) based on a return force, such as by return spring 150.

In particular embodiments, such a condition of non-corresponding axial motion of armature 220 and lock plate 140 may be due to so-called "torque trap" situation. By way of example and not limitation, a "torque trap" may be based on the applied torque, gear meshing forces, and/or frictional forces between lock plate 140 and its contacting surfaces acting to keep lock plate 140 engaged with lock gear 135, such as by said torques and/or forces exceeding an ability of return spring 150 to separate lock plate 140 from lock gear 135. In such an undesirable and/or unexpected situation, for instance, a lock detection sensor assembly 410 may erroneously interpret an axial position of armature 220 as indicating an unlocked differential, while lock plate 140 may in fact continue to hold differential assembly 110 in a locked state, such as by sustained engagement with lock gear 135.

In particular embodiments, it may be separately or additionally possible for armature 220 (and by extension, a component of lock detection sensor assembly 410, such as sensor target 430, that may be couple to armature 220) to tilt, rotate, offset, translate, or otherwise experience motion due to vibrations, bumps, and other disturbances applied during operation. Such position disturbance, variation, and/or perturbation of armature 220, and/or a coupled component of lock detection sensor assembly 410, may lead to an interpretation by sensor detection of a locked or unlocked state that is contrary to the true locked or unlocked state of differential assembly 110. Deviation of the positional capability of armature 220 relative to its design intent may be referred to as runout, which can lead to variation in the ability to accurately sense a lock position of differential assembly 110.

Therefore, it can be important to suitably constrain armature 220 to: (a) axially translate correctly and in close correspondence with an axial motion of lock plate 140 in both locked and unlocked states (for example, by way of slip ring 320, transfer pins 340, and/or separately or additionally using other features), and (b) be piloted to remain concentric with the rotational axis of differential assembly 110, and/or resisting tilting, rotating, offsetting, and other motions due to disturbances during operation.

As discussed previously herein, particular design features disclosed herein may be used to provide one or more of the following: (i) relative rotational motion (slip) between armature 220 and slip ring 320, to permit armature 220 to remain rotationally stationary relative to the rotating components of differential assembly 110; (ii) transmission of axial forces and/or axial translations between armature 220 and slip ring 320; (iii) more rigid constraint of armature 220 to move in close axial correspondence with slip ring 320, transfer pins 340, and/or lock plate 140.

In particular embodiments, such as seen in FIG. 1, armature 220 may be radially constrained by, and/or piloted on, a surface of slip ring 320 at the inner diameter of the armature 220. In some embodiments, the respective interfacing or contacting surfaces of armature 220 and slip ring 320 may not contact along one or both of their full axial lengths. In particular embodiments, armature 220 may be supported, constrained, and/or piloted in multiple dimensions. By way of example and not limitation, such as seen in FIG. 5, armature 220 may interface at its inner diameter with a substantially flat section of slip ring 320, and/or be axially constrained between a raised edge or lip section of slip ring 320, and a snap ring 238. In particular embodiments, such as seen in FIG. 1, a longer section or a full inner diameter surface (i.e., along a full axial length) of armature 220 may be supported and/or piloted at an interface or contacting surface with slip ring 320.

Figure 6B:
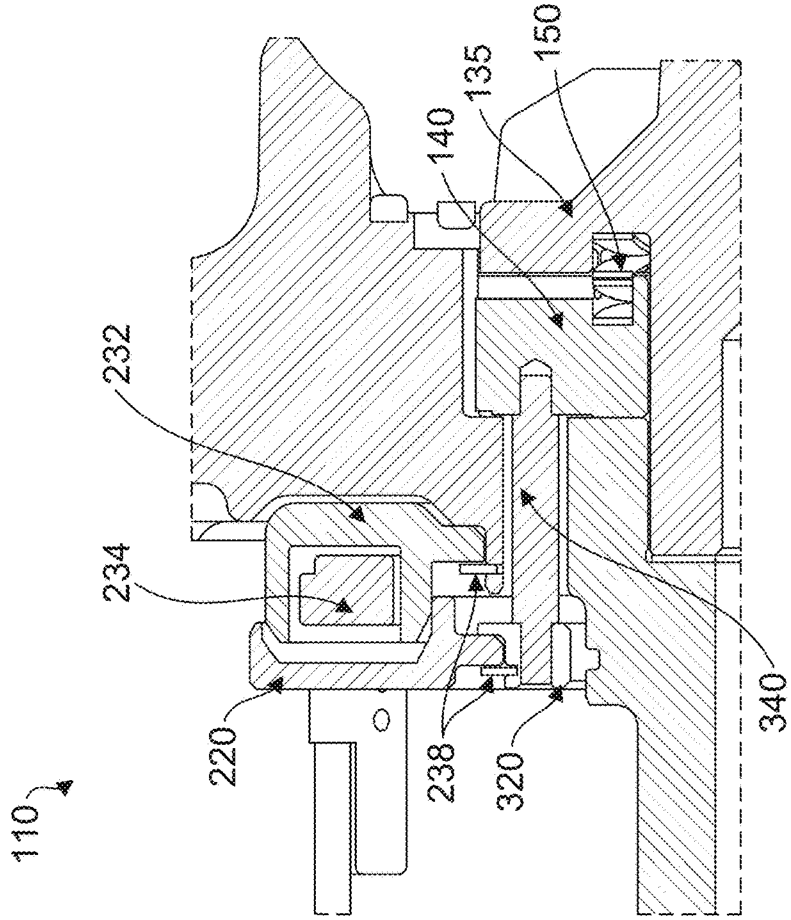
FIGS. 6A and 6B illustrate schematic enlarged sectional side views of particular exemplary embodiments of electronically locking differential assemblies, illustrating different design features.
Figure 6A:
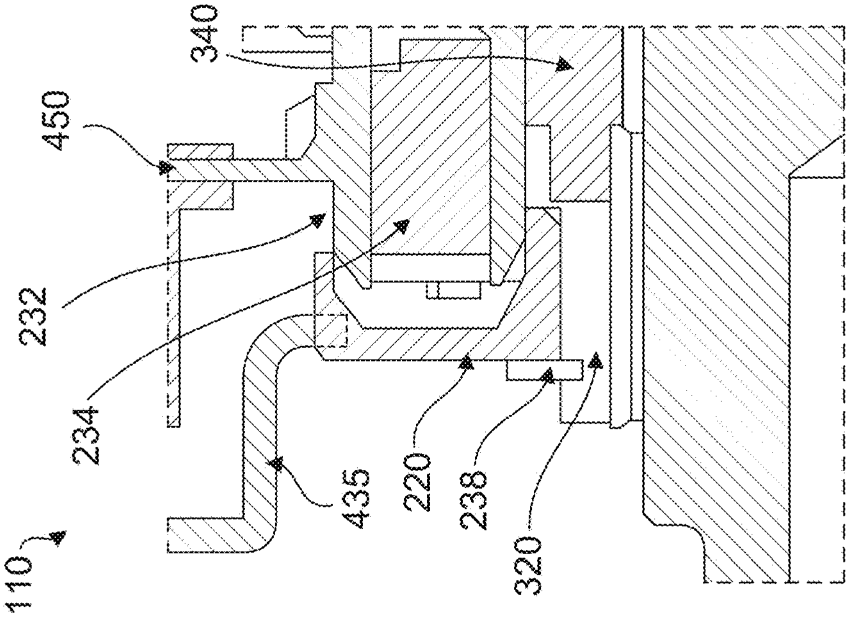
Figure 7B:
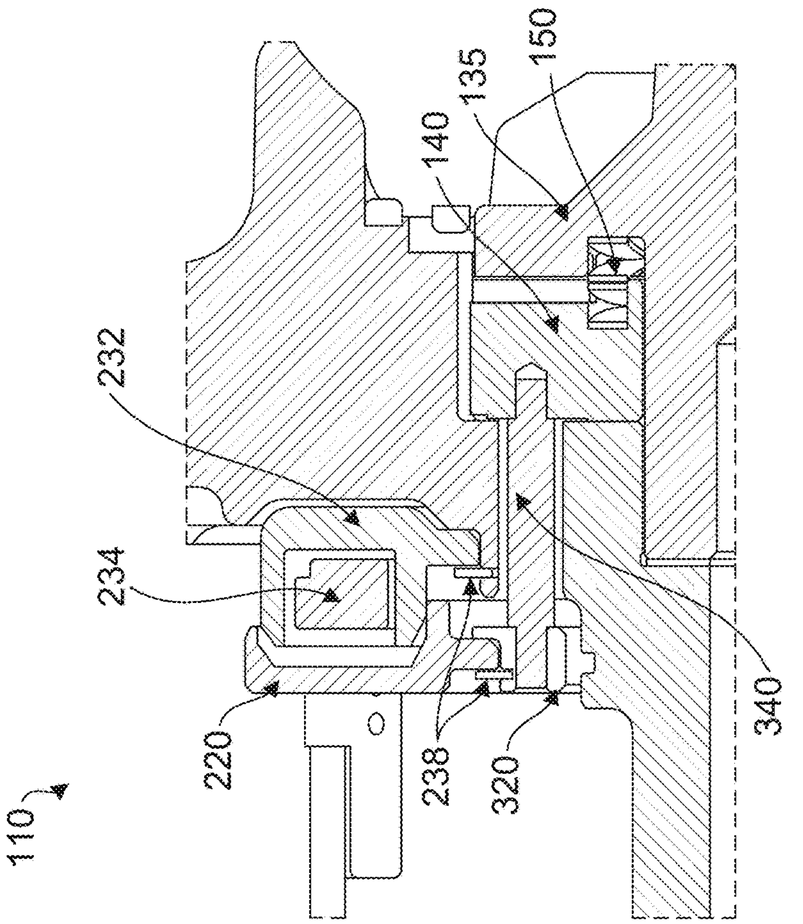
FIGS. 7A and 7B illustrate schematic enlarged sectional side views of particular exemplary embodiments of electronically locking differential assemblies, depicting and contrasting design features.
Figure 7A:
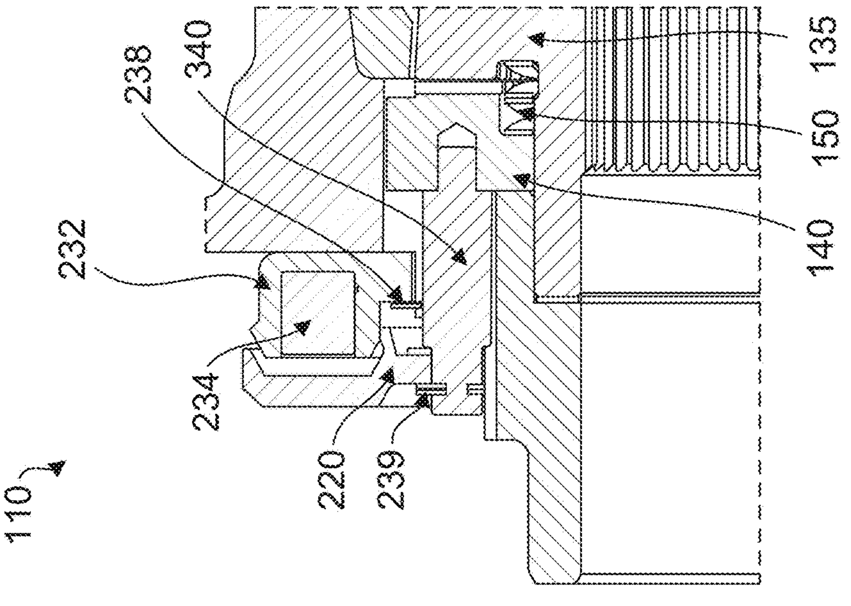

Side-by-side comparisons, separately provided by way of non-limiting examples in FIGS. 6 and 7, can provide visual comparisons of relative design choices and configurations of particular embodiments for supporting armature 220, and/or for transferring axial motion between armature 220 and lock plate 140.

In particular embodiments, transfer pins 340 may be configured to be press-fit into the lock plate 140. Separately or additionally, in particular embodiments, transfer pins 340 may be configured to be press-fit into slip ring 320. One or both of the above features may separately or additionally constrain an axial travel of armature 220 to follow, and/or be otherwise closely equivalent to that of lock plate 140, i.e., to enable higher correspondence of axial armature motion and axial lock plate motion. In particular embodiments, there can be one or more separate or additional features, such as mechanical coupling features between transfer pins 340 and slip ring 320. By way of example and not limitation, additional features, devices, and/or methods can comprise press-fitting, snap rings, key slots, and/or welds. In some embodiments, there may be a mechanical coupling between transfer pins 340 and lock plate 140, such as by a press-fit, snap ring, key slots, and/or welds.

In some embodiments, an additional component, such as a snap ring, may be used to further axially constrain the armature. Examples can be seen in FIGS. 1 and 5, where snap rings 238 are depicted at the bottom left corner of armature 220 (in the frames of reference of those figures), to constrain armature 220 from translating further left relative to slip ring 320.

As disclosed, particular embodiments including the use of a slip ring 320 in the context of electronically locking differential assemblies 110 may provide performance advantages during operation, in both as-designed conditions, and during unexpected behavior in off-design situations. The use of a slip ring 320 in this context may separately or additionally provide benefits relating to manufacturing, assembly, servicing, repair, maintenance, and/or replaceability.

In particular embodiments, as previously discussed herein, stator 230, which may comprise stator housing 232 (and stator coil 234 within it), can be held rotationally stationary relative to particular rotating components of differential assembly 110, such as a differential housing. Separately or additionally, for several embodiments disclosed herein, armature 220 may be held rotationally stationary relative to particular rotating components of differential assembly 110.

In particular embodiments, holding particular components rotationally stationary relative to other rotating parts of differential assembly 110 may be accomplished by rigidly connecting those components of interest to one or more other rotationally stationary elements, such as an external structural element. By way of example and not limitation, a rotationally stationary external structural element can include an axle housing, a cover, and/or an external casing. In particular embodiments, a structural element used to constrain a given component of the differential assembly 110 to be rotationally stationary may be referred to herein as an anti-rotation element. In particular embodiments, an anti-rotation function may be served by components particularly developed for the purpose, such as based on design needs and packaging constraints. By way of example and not limitation, an anti-rotation function may be provided by an anti-rotation tab, and/or an anti-rotation bracket.

Figure 8B:
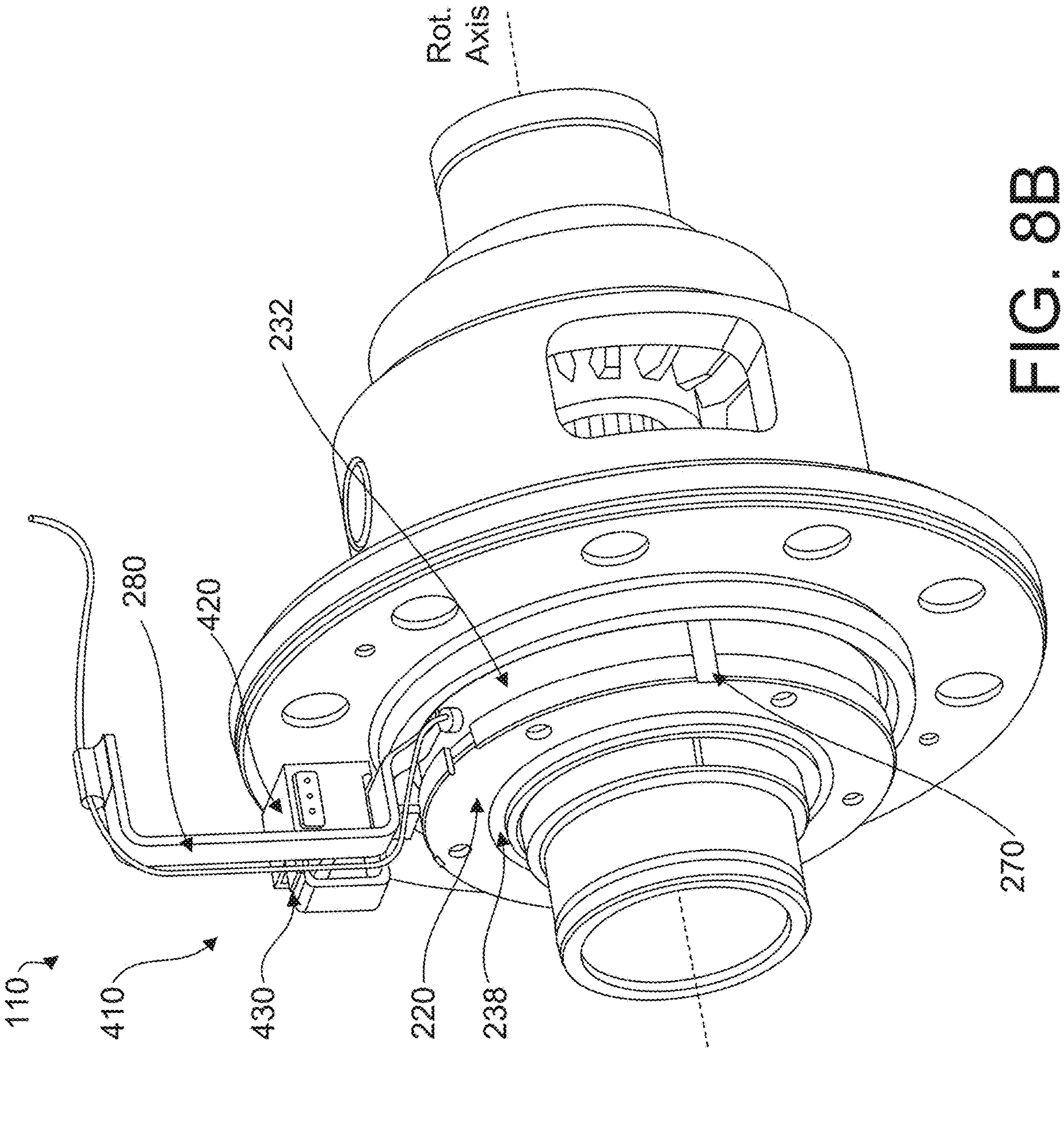
FIG. 8B illustrates a schematic front perspective view of an electronically locking differential assembly, according to particular embodiments.
Figure 8C:
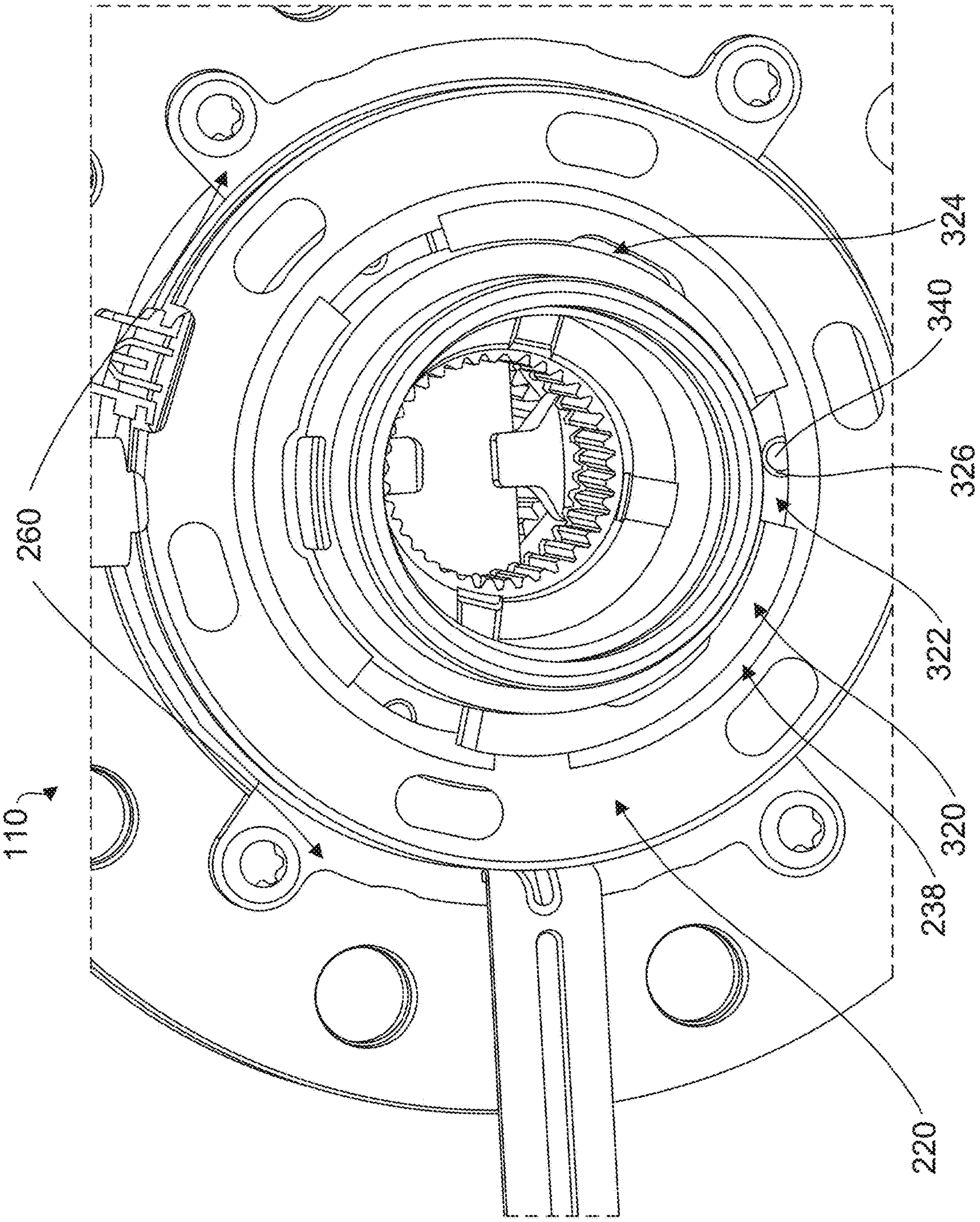
FIG. 8C illustrates a schematic front perspective view of an electronically locking differential assembly, according to particular embodiments.

FIGS. 8B and 9 illustrate schematic front perspective views of an electronically locking differential assembly, according to particular embodiments. By way of example and not limitation, FIGS. 8B and 9 depict embodiments of (i) an anti-rotation bracket 280, to rotationally constrain the stator housing 232 to be rotationally stationary relative to rotating components, such as by interfacing with an external support in an axle housing 510, and (ii) an anti-rotation tab 270, to rotationally couple armature 220 to stator housing 232, thereby constraining armature 220 to be rotationally stationary based on stator housing 232 being rotationally stationary due to anti-rotation tab 270. It will be appreciated that while specific methods and devices are illustrated for providing an anti-rotation function, this disclosure fully contemplates any suitable devices and methods, and/or combinations thereof, for providing an anti-rotation function.

In particular embodiments, clocking of components may refer to circumferentially locating components, such as concentrically disposed components, relative to each other, and/or relative to an external circumferential reference. By way of example and not limitation, in particular embodiments, a lock detection sensor 420 may be clocked with respect to stator housing 232 to locate lock detection sensor 420 at a circumferentially specific location relative to a sensor target 430, which may be circumferentially co-located (see for example, FIGS. 1 and 2). In particular embodiments, sensor target 430 may be clocked based on armature 220 to correctly circumferentially locate sensor target 430 relative to lock detection sensor 420 (for example, FIGS. 1 and 2).

In particular embodiments, a tab or coupling tab may separately or additionally be used for clocking the armature 220 relative to stator housing 232. By way of example and not limitation, anti-rotation tab 270, depicted in FIGS. 8B and 9, may be used for rotationally coupling armature 220 to stator housing 232 while permitting relative axial motion therebetween.

In particular embodiments, a design aspect of metal tabs and/or asymmetric circumferential distribution of such tabs can interfere with sensitive magnetic sensing equipment associated with differential assembly 110, such as lock detection sensor assembly 410. Additional details and aspects relating to the lock detection sensor will be further discussed herein.

In particular embodiments, a combination of functions, such as anti-rotation, clocking, and/or wire routing as non-limiting examples, may be performed by one or more structures, which may be multi-functional structures. In particular embodiments, multi-functional structures can address particular design and/or packaging constraints of differential assembly 110.

Figure 10:
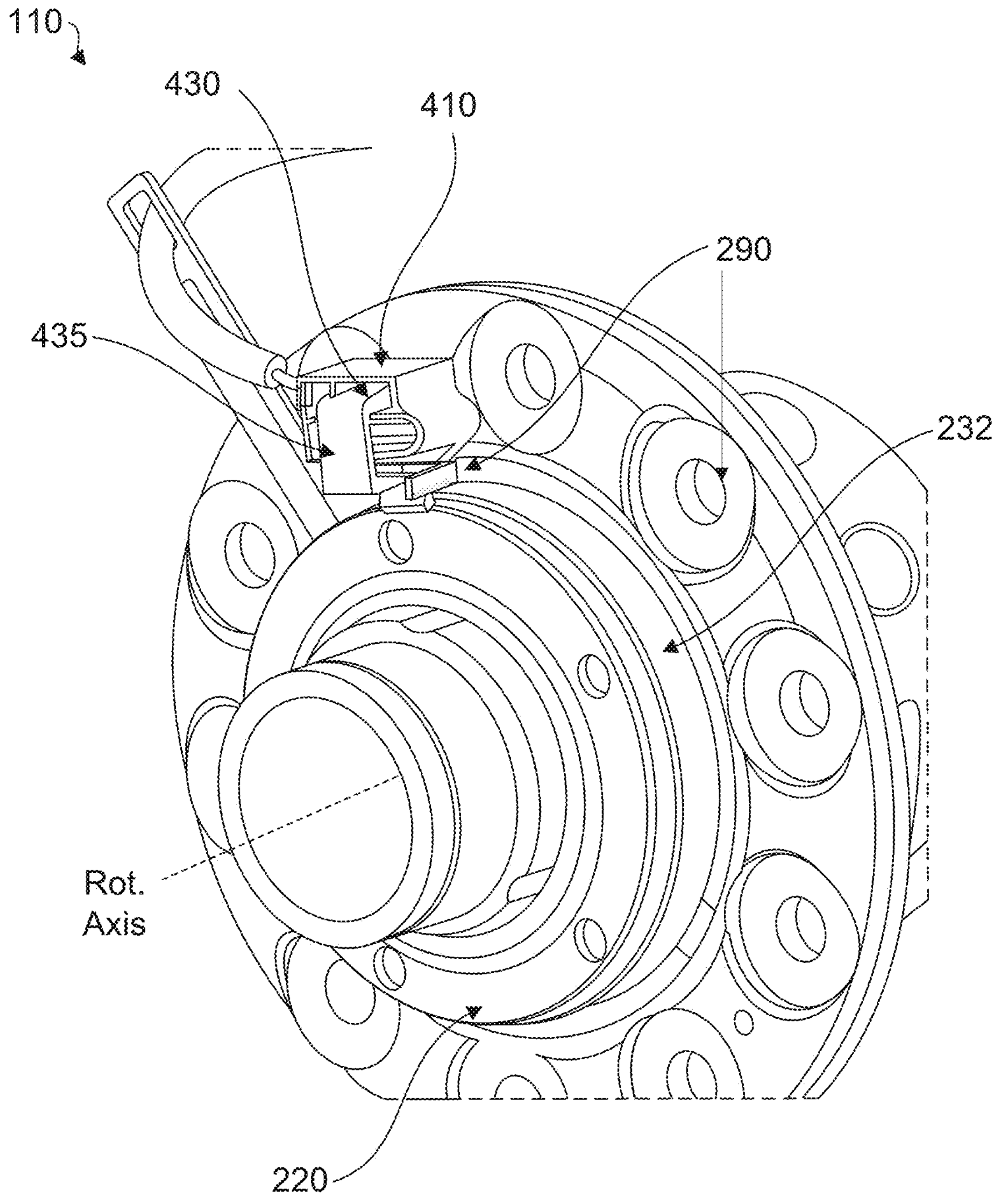
FIG. 10 illustrates a schematic front perspective view of an electronically locking differential assembly, according to particular embodiments.
Figure 11:
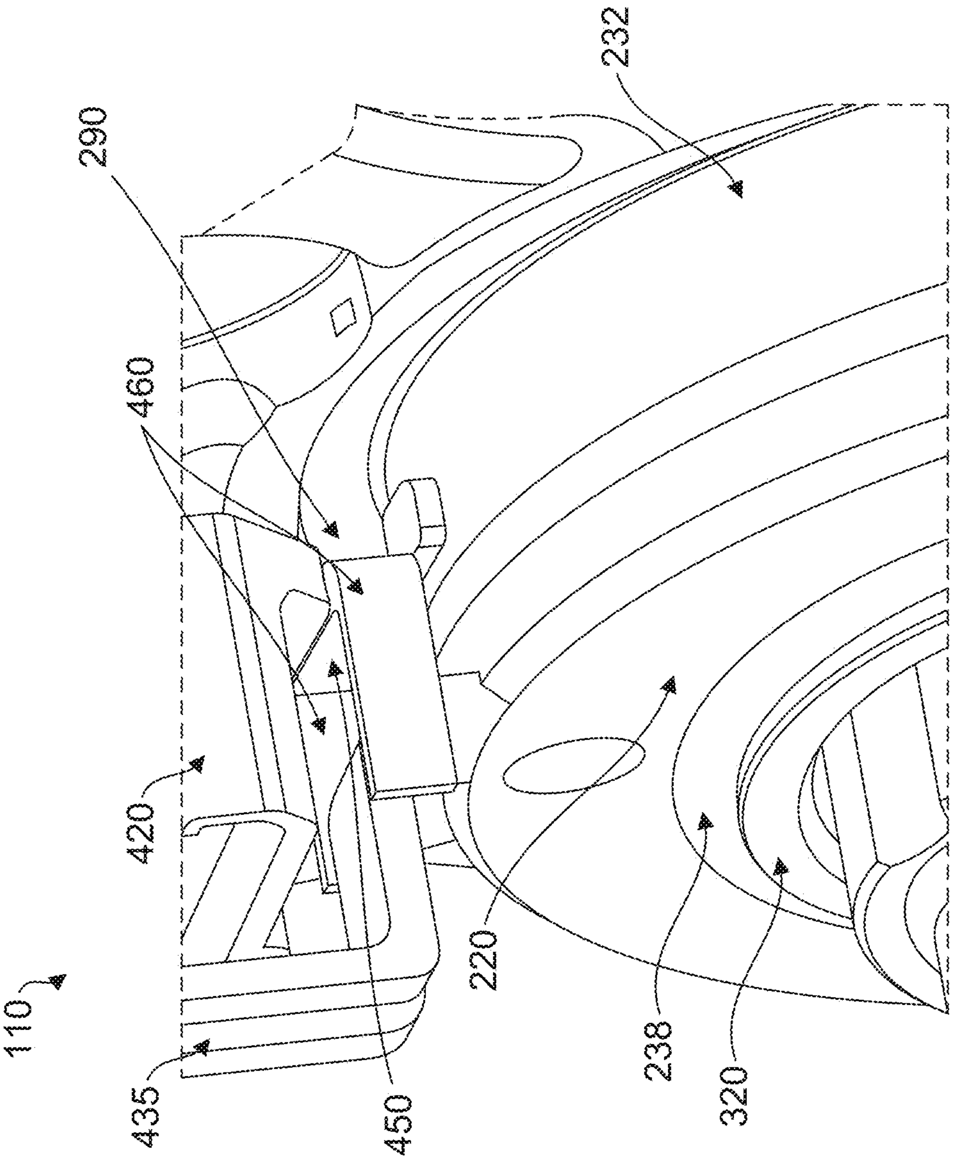
FIG. 11 illustrates a schematic enlarged front perspective view of an electronically locking differential assembly, according to particular embodiments.
Figure 12A:
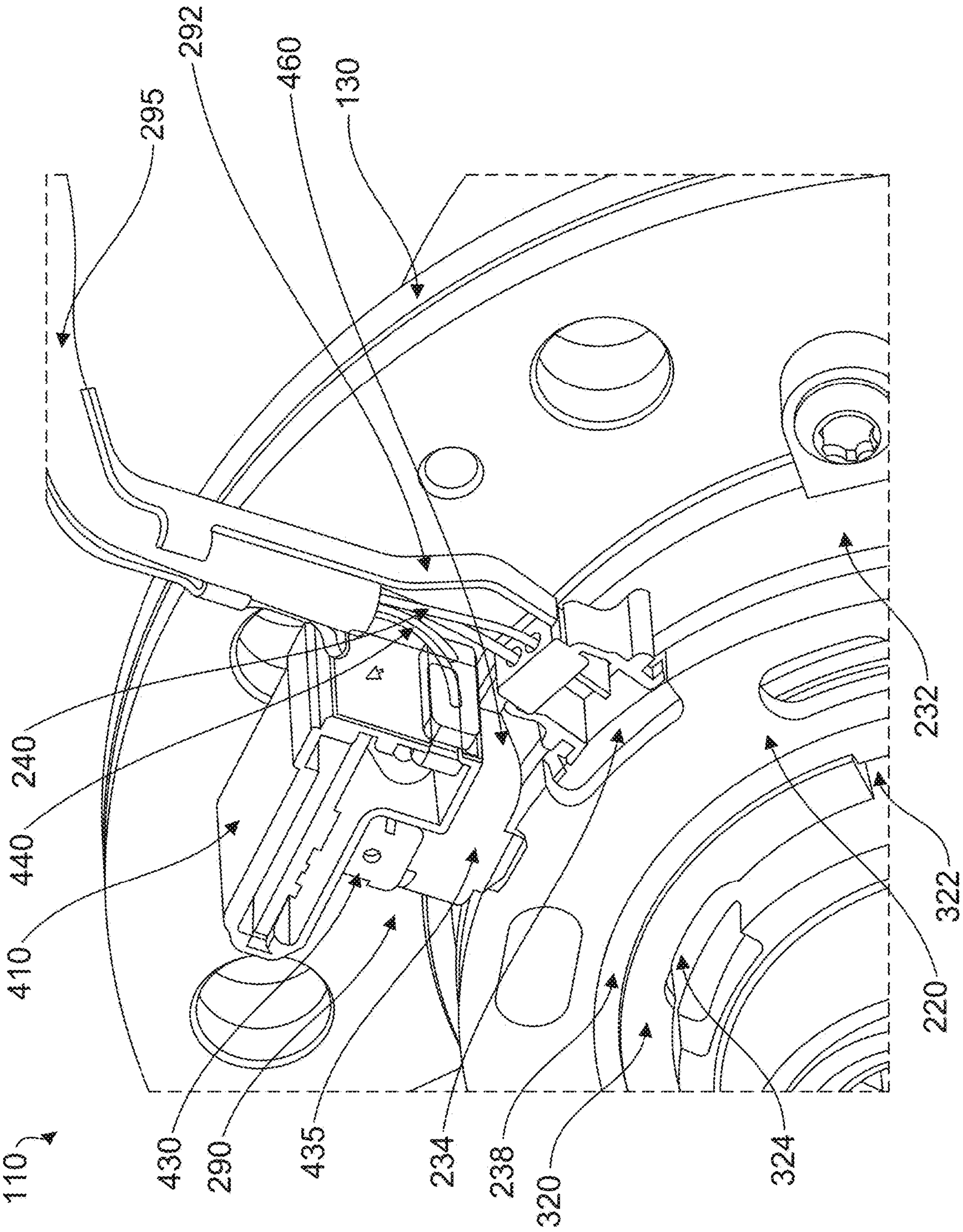
FIG. 12A illustrates a schematic enlarged front perspective view of an electronically locking differential assembly, according to particular embodiments.
Figure 12B:
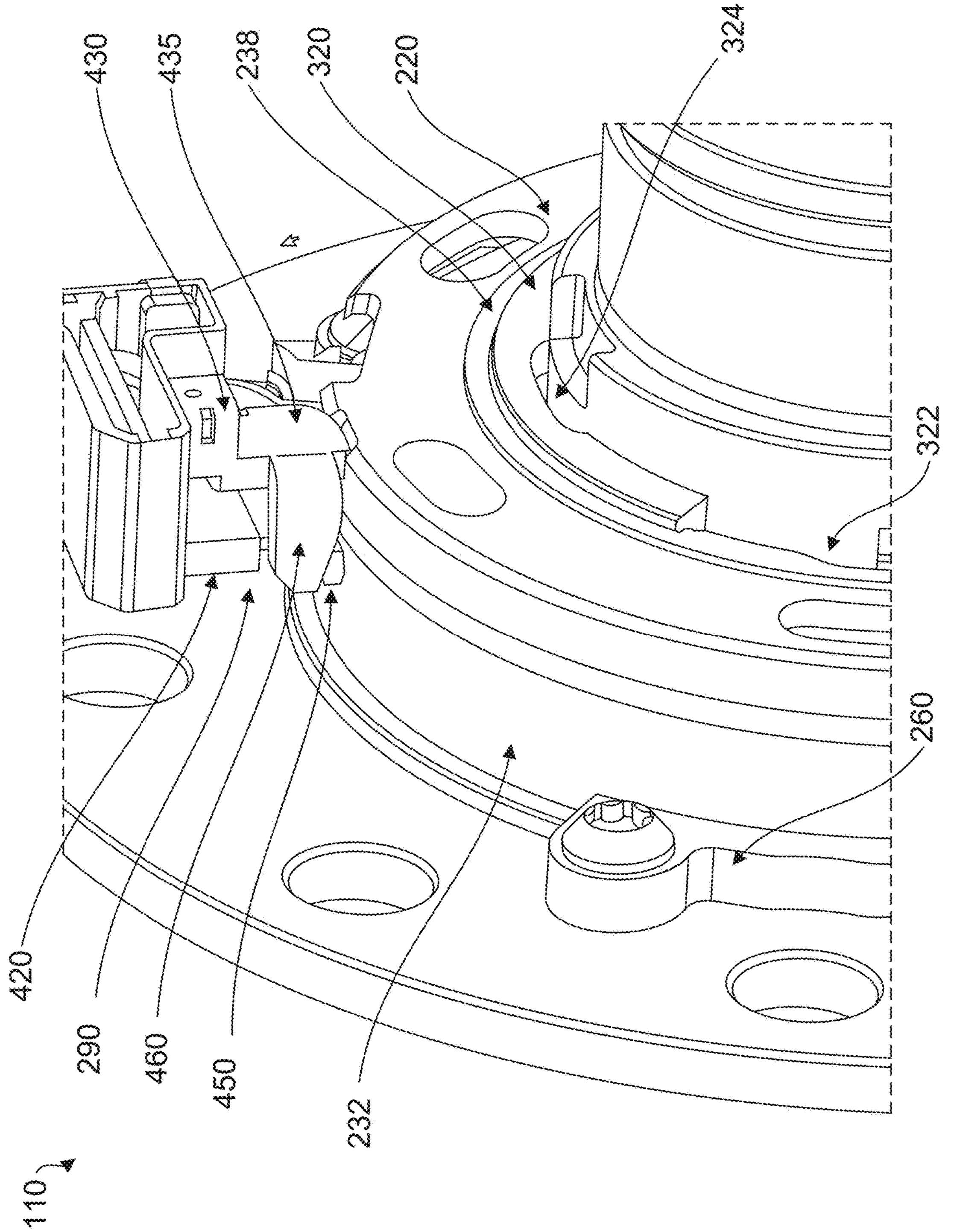
FIG. 12B illustrates a schematic enlarged front perspective view of an electronically locking differential assembly, according to particular embodiments.
Figure 12C:
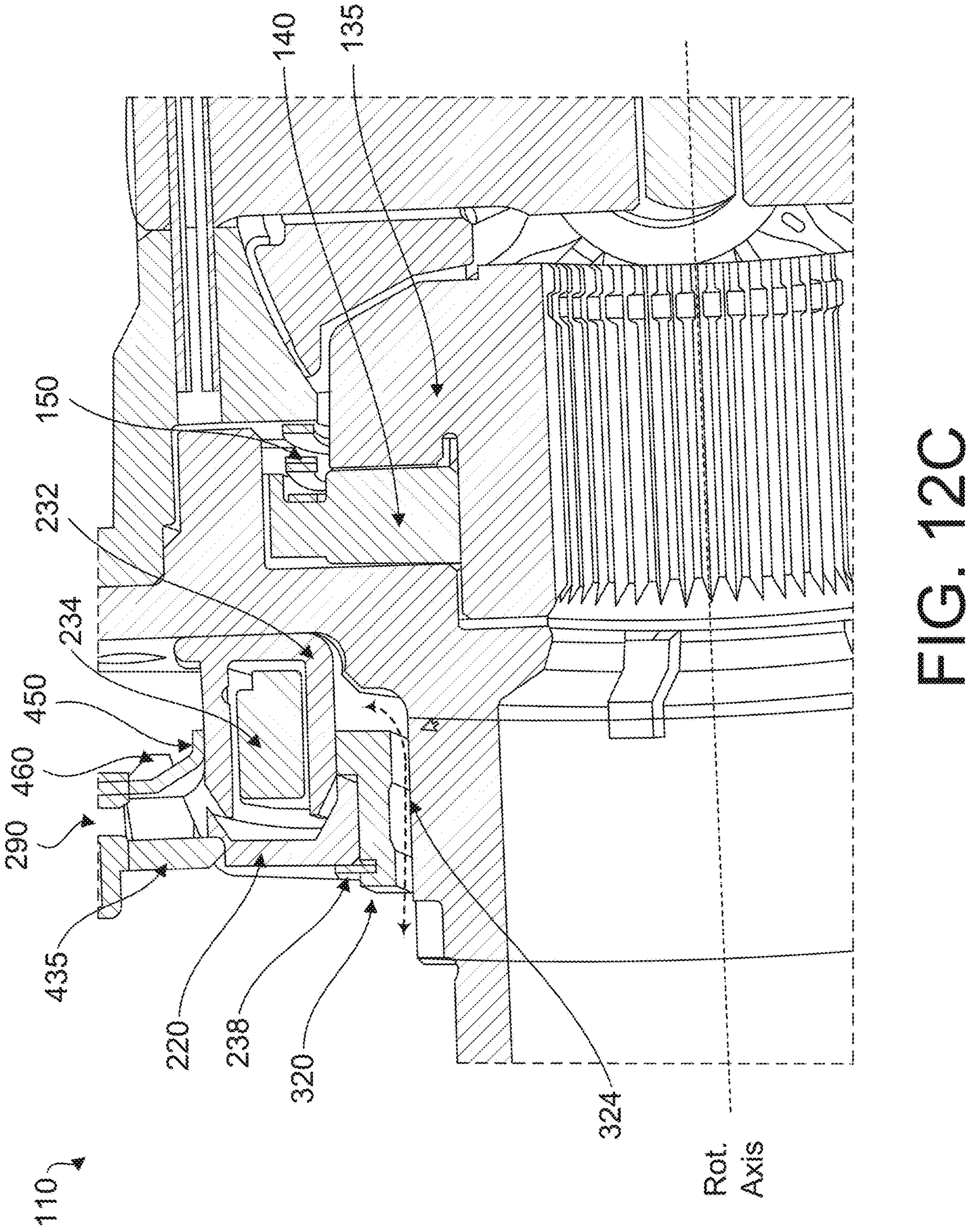
FIG. 12C illustrates a schematic sectional side view of an electronically locking differential assembly, according to particular embodiments.
Figure 12D:
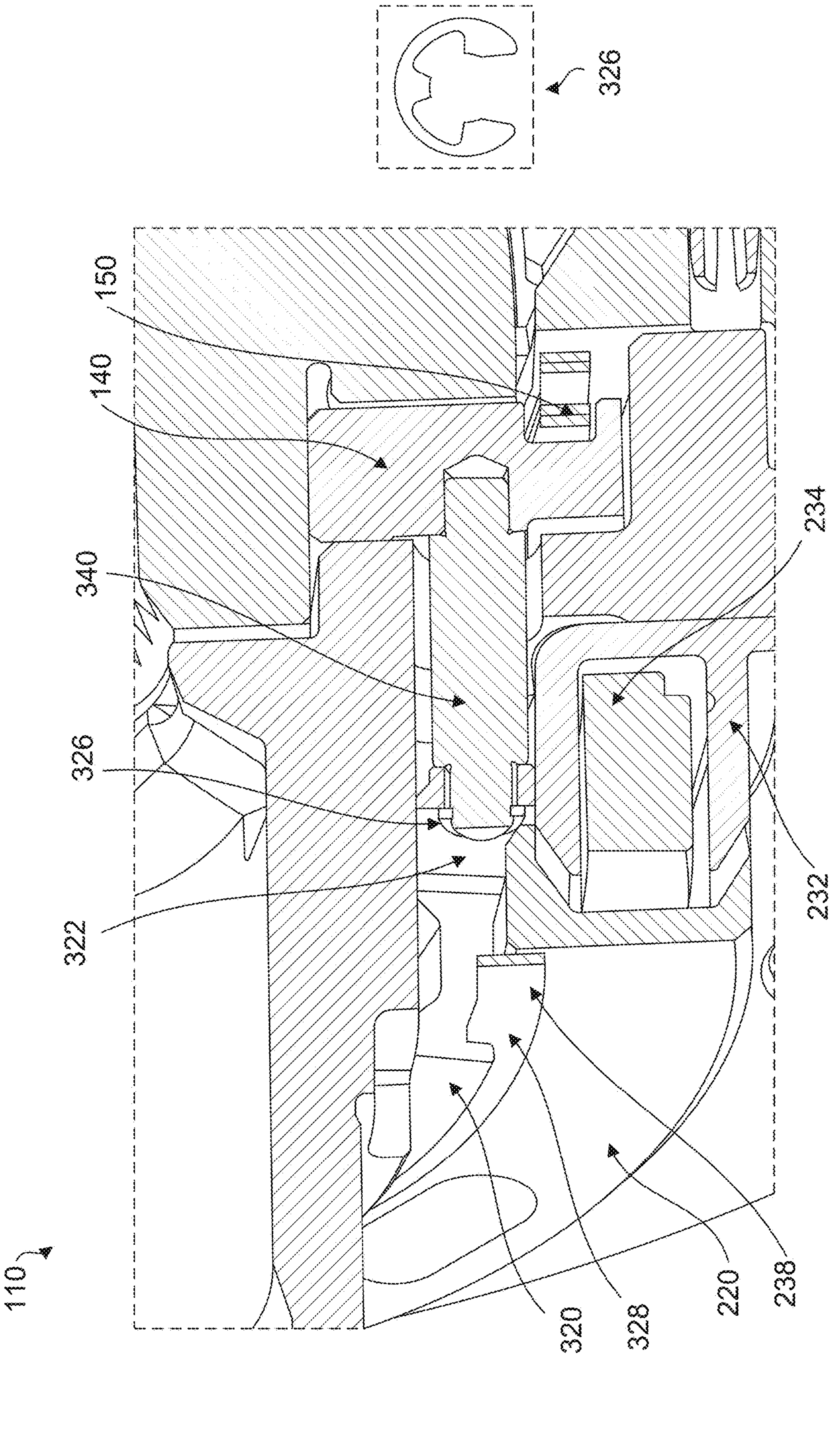
FIG. 12D illustrates a schematic sectional side perspective view of an electronically locking differential assembly, according to particular embodiments.

By way of example and not limitation, such as illustrated in FIGS. 10, 11, 12A, and/or 12B, clocking and/or rotational coupling of armature 220 relative to stator 230 may be provided by an anti-rotation assembly 290. In particular embodiments, anti-rotation assembly 290 may be provided proximal to the lock detection sensor assembly 410. Separately or additionally, in particular embodiments, anti-rotation assembly 290 may be provided in a suitable and/or symmetric location, such as a magnetically symmetric location relative to the lock detection sensor assembly 410.

As illustrated by way of non-limiting example in FIGS. 10, 11, 12A, and/or 12B, in particular embodiments, anti-rotation assembly 290 may comprise sensor post 450 rigidly connected to stator housing 232, and to the lock detection sensor 420. In particular embodiments, sensor target 430 may be rigidly connected to armature 220 by sensor target bracket 435.

Clocking and/or rotational coupling between the lock detection sensor and the sensor target may be accomplished in particular embodiments by anti-rotation assembly 290. By way of example and not limitation, such as illustrated in FIGS. 10 and 11, clocking and/or rotation coupling may be provided by locating or capturing a member coupled to armature 220, such as sensor target bracket 435, between rigid extended structural elements, such as prongs 460. Such extended structural members may be provided on one or both sides of a corresponding member coupled to stator housing 232, such as sensor post 450. Accordingly, in particular embodiments, anti-rotation assembly 290 may constrain relative rotational motion between prongs 460 and the sensor target bracket 435 trapped therebetween. Based on their respective rigid connections to the sensor post 450 and to sensor target bracket 435, clocking and/or rotational coupling between stator housing 232 and armature 220 may be obtained by such an arrangement.

By way of example and not limitation, such as illustrated in FIGS. 12A-12C, extended structural elements, such as prongs 460, may be provided on sensor target bracket 435 coupled to armature 220, such that sensor post 450 coupled to stator housing 232 may be captured therebetween.

In particular embodiments, anti-rotation assembly 290 may comprise a connecting member, such as sensor post 450, coupling lock detection sensor 420 to stator housing 232. In particular embodiments, separately or additionally, a connecting member, such as sensor target bracket 435, may be provided for coupling sensor target 430 to armature 220. In particular embodiments, either or both connecting members, such as sensor post 450 and/or sensor target bracket 435, may be configured to constrain armature 220 in a fixed rotational position relative to the stator 230. By way of example and not limitation, either or both connecting members may include one or more extended structures, such as prongs 460, to constrain armature 220 in a fixed rotational position relative to the stator 230.

In particular embodiments, such as illustrated in FIG. 12A by way of non-limiting example, a multi-functional structure such as a unitary housing 292 may be provided for providing a number of functions. By way of example and not limitation, unitary housing 292 may provide a housing for lock detection sensor 420, and/or protect and guide electrical leads 240 for stator 230, and/or electrical leads 440 for lock detection sensor assembly 410. In particular embodiments, multiple sets of electrical leads, such as described above, may be combined into a unified cable 295, which may optionally terminate at a unified electrical connector for an interfacing with a vehicle harness. Separately or additionally, unitary housing 292 may include, cover, or couple to sensor post 450.

Some implementations of features may adversely affect the detection capability of lock detection sensor assembly 410, such as by disturbing a magnetic field and/or magnetic flux distribution around lock detection sensor assembly 410. Such features, which may include without limitation slip ring 320, one or more transfer pins 340, anti-rotation assemblies 290 and/or tabs 270, may adversely affect the detection capability of lock detection sensor assembly 410 based on their respective relative location(s), and/or magnetically asymmetric distributions or relative position(s).

In particular embodiments, detection of an axial distance between stator 230 and armature 220 by the lock detection sensor assembly 410 may be based on detecting a magnetic field strength. By way of example and not limitation, slip ring 320 can be configured to be symmetric, such as magnetically symmetric, about a longitudinal plane passing through the rotational axis of differential assembly 110 and the lock detection sensor assembly 410 to facilitate an increased accuracy of lock detection. By way of example and not limitation, a distribution of transfer pins 340 can be configured to be symmetric, such as magnetically symmetric, about a longitudinal plane passing through the rotational axis of differential assembly 110 and the lock detection sensor assembly 410 to facilitate an increased accuracy of lock detection. By way of example and not limitation, a symmetry of slip ring 320 may refer to a symmetry of magnetic field based on slip ring 320, and/or magnetic field disturbance due to slip ring 320. In particular embodiments, a symmetry of slip ring 320 may be based on rotation of slip ring 320 about the rotational axis of differential assembly 110.

Based on their relative location to the lock detection sensor assembly 410, a suitable choice of materials, design, geometry, relative location, and/or relative distribution of, without limitation, slip ring 320, transfer pins 340, anti-rotation assemblies 290 and/or tabs 270, can significantly reduce or eliminate such undesirable interference effects on the sensing capability of the lock detection sensor, for instance, by reducing or eliminating magnetic variabilities, interference and/or losses.

Miscellaneous

The foregoing description of the embodiments has been provided for purposes of illustration and description. It is not intended to be exhaustive or to limit the disclosure. While several embodiments of the device, systems, and methods have been described in detail, including the best mode, those familiar with the art to which this disclosure relates will recognize various alternative designs and embodiments for practicing the teachings. Individual elements or features of a particular embodiment are generally not limited to that particular embodiment, but, where applicable, are interchangeable and can be used in a selected embodiment, even if not specifically shown or described. For example, it is possible that each of the characteristics described in one of the examples of an embodiment can be combined with one or a plurality of other desired characteristics from other embodiments, resulting in other embodiments not described in words or by reference to the drawings. It will also be understood that changes and modifications may be made by those of ordinary skill within the scope of the disclosure, illustrations, and/or the following claims. Such variations are fully contemplated herein and not to be regarded as a departure from the disclosure, and all such modifications are intended to be included within the scope of the disclosure.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Numerical ranges recited in this application should be construed to be inclusive of the end points of the stated ranges. Particular axes, such as one or more rotational, lateral and/or longitudinal axes, which may be omitted herein in some illustrations, should be construed to exist in every illustration or situation where it is referred to.

The invention claimed is:

1. A lockable differential assembly comprising:

a lock plate rotatable about a rotational axis, wherein the differential assembly is configured to be in a locked state or an unlocked state based on a selective axial engagement of the lock plate relative to a lock gear;

an actuator assembly comprising a stator and an armature, the actuator assembly configured to be switchable between an energized state and a de-energized state; and a slip ring assembly configured to axially translate corresponding to the locked state or the unlocked state of the differential assembly, the slip ring assembly comprising:

a slip ring interfacing with the armature at a slip surface configured to permit relative rotation between the slip ring and the armature; and one or more pins rotationally coupling the slip ring to the lock plate, wherein the stator and the armature are each radially supported directly on the slip ring so as to radially align the stator and the armature relative to the rotational axis, wherein the slip ring assembly is configured to transmit an axial locking force from the actuator assembly to the lock plate when the actuator assembly is energized, and wherein the slip ring assembly is configured to transmit an axial return force from the lock plate to the actuator assembly when the actuator assembly is de-energized.

2. The differential assembly of claim 1, further comprising a lock detection sensor assembly comprising a sensor and a target, the lock detection sensor assembly configured for detection of an axial distance between the stator and the armature.

3. The differential assembly of claim 2, wherein one of the sensor and the target is coupled to the armature, and the other of the sensor and the target is coupled to the stator.

4. The differential assembly of claim 2, further comprising an anti-rotation assembly comprising:

a first connecting member coupling the sensor of the lock detection sensor assembly to a stator housing of the actuator assembly; and a second connecting member coupling the target of the lock detection sensor assembly to the armature, wherein the first connecting member or the second connecting member comprises one or more extended structures configured to constrain the armature in a fixed rotational position relative to the stator.

5. The differential assembly of claim 2, wherein the detection of the axial distance between the stator and the armature by the lock detection sensor assembly is based on detecting a magnetic field strength.

6. The differential assembly of claim 1, wherein the stator comprises a stator coil, wherein energizing the actuator assembly comprises passing electrical current through the stator coil to generate a magnetic field, and wherein the armature experiences a magnetic force toward the stator coil based on the magnetic field generated when the actuator assembly is energized.

7. The differential assembly of claim 6, wherein the slip ring is configured to focus the magnetic field generated in the energized state of the actuator assembly through an air gap between the armature and the stator to facilitate an increased efficiency of the actuator assembly actuating the locked state of the differential assembly.

8. The differential assembly of claim 1, wherein the slip ring comprises at least one axial groove to permit flow of a hydraulic fluid for lubrication.

9. The differential assembly of claim 1, wherein the slip ring comprises at least one axial groove to facilitate a reduced hydraulic damping of the axial translation of the slip ring assembly.

10. The differential assembly of claim 1, wherein, for each of the one or more pins, the slip ring comprises:

a bore having a bore diameter and configured to receive a respective pin of the one or more pins; and a slot configured to facilitate access to the respective pin, wherein a slot width of the slot has a value between the bore diameter and ten times the bore diameter.

11. The differential assembly of claim 1, wherein the slip ring assembly further comprises one or more features configured to axially constrain the armature relative to the slip ring.

12. The differential assembly of claim 11, wherein one or more of the features are further configured to axially constrain the slip ring relative to the one or more pins.

13. The differential assembly of claim 11, wherein one or more of the features comprise a groove or a raised edge provided in the slip ring or the one or more pins.

14. The differential assembly of claim 11, wherein one or more of the features comprise a washer, a snap ring, or an e-clip.

15. The differential assembly of claim 1, wherein one or more of the pins are press-fit into the lock plate.

16. An electronically lockable differential assembly capable of lock detection, the differential assembly comprising:

a differential casing;

a lock gear rotatably provided within the differential casing;

a lock plate rotatable about a rotational axis, wherein the differential assembly is configured to be in a locked state or an unlocked state based on a selective axial engagement of the lock plate relative to the lock gear;

a biasing member configured to axially bias the lock plate away from the lock gear;

an actuator assembly comprising a stator and an armature, the actuator assembly configured to be switchable between an energized state and a de-energized state;

a lock detection sensor assembly comprising a sensor and a target, the lock detection sensor assembly configured to detect a magnetic field strength indicative of an axial distance between the stator and the armature so as to determine an axial position of the lock plate relative to the lock gear; and a slip ring assembly configured to axially translate corresponding to the locked state or the unlocked state of the differential assembly, the slip ring assembly comprising:

a slip ring interfacing with the armature at a slip surface configured to permit relative rotation between the slip ring and the armature; and one or more pins rotationally coupling the slip ring to the lock plate, wherein the slip ring assembly is configured to transmit an axial locking force from the actuator assembly to the lock plate when the actuator assembly is energized, and wherein the slip ring assembly is configured to transmit an axial return force from the lock plate to the actuator assembly when the actuator assembly is de-energized.

17. The differential assembly of claim 16, wherein the slip ring comprises at least one axial groove to permit flow of a hydraulic fluid and facilitate a reduced hydraulic damping of the axial translation of the slip ring assembly.

18. A method of assembling a lockable differential assembly, the method comprising:

providing a lock gear and a lock plate within a differential casing, the lock gear and the lock plate selectively engageable by relative axial translation, the lock gear and the lock plate axially biased apart by a biasing member and rotatable about a rotational axis;

rotationally coupling the lock plate with a slip ring via one or more pins, a slip ring assembly comprising the slip ring and the one or more pins;

providing an actuator assembly comprising a stator and an armature, the slip ring axially coupled with the armature, a slip interface between the slip ring and the armature configured to permit relative rotation therebetween, wherein the armature is configured to axially translate toward the stator based on energizing the actuator assembly; and providing a lock detection sensor assembly comprising at least one sensor component respectively coupled to each of the armature and the stator, the lock detection sensor assembly configured to detect a magnetic field strength indicative of an axial distance between the stator and the armature so as to determine an axial position of the lock plate relative to the lock gear, wherein the slip ring assembly is configured to transmit an axial locking force from the actuator assembly to the lock plate when the actuator assembly is energized, and wherein the slip ring assembly is configured to transmit an axial return force from the lock plate to the actuator assembly when the actuator assembly is de-energized.

* * * * *